US007001272B2

(12) United States Patent
Yamashita et al.

(10) Patent No.: US 7,001,272 B2
(45) Date of Patent: Feb. 21, 2006

(54) VIDEO GAME DEVICE, VIDEO GAME METHOD, VIDEO GAME PROGRAM, AND VIDEO GAME SYSTEM

(75) Inventors: Akihisa Yamashita, Tokyo (JP); Masato Nagatomi, Tokyo (JP); Kenichi Yamamoto, Tokyo (JP); Hideki Kotani, Kobe (JP)

(73) Assignee: Konami Corporation, Tokyo (JP)

( * ) Notice: Subject to any disclaimer, the term of this patent is extended or adjusted under 35 U.S.C. 154(b) by 455 days.

(21) Appl. No.: 10/106,259

(22) Filed: Mar. 27, 2002

(65) Prior Publication Data

US 2002/0151337 A1    Oct. 17, 2002

(30) Foreign Application Priority Data

Mar. 29, 2001   (JP)   ............................. 2001-096856

(51) Int. Cl.
*A63F 13/00* (2006.01)
(52) U.S. Cl. .......................................... 463/7; 463/31
(58) Field of Classification Search .................... 463/1, 463/30–31, 36, 39, 40, 42, 7, 8, 46; 700/91–92; 434/247–249, 251–252; 473/198–200, 219–226, 473/351, 353, 489; 273/148 B
See application file for complete search history.

(56) References Cited

U.S. PATENT DOCUMENTS

| 4,858,934 A | 8/1989 | Ladick et al. |
| 4,971,325 A | 11/1990 | Lipps |
| RE33,662 E * | 8/1991 | Blair et al. ..................... 463/3 |
| 5,288,078 A * | 2/1994 | Capper et al. ................. 463/39 |
| 5,577,981 A * | 11/1996 | Jarvik ............................. 482/4 |
| 5,616,078 A | 4/1997 | Oh |
| 5,685,782 A | 11/1997 | Lipps et al. |
| 5,730,655 A | 3/1998 | Meredith |
| 6,028,593 A | 2/2000 | Rosenberg et al. |
| 6,162,123 A * | 12/2000 | Woolston ...................... 463/37 |
| 6,416,327 B1 | 7/2002 | Wittenbecher |

FOREIGN PATENT DOCUMENTS

| JP | 2-33617 A | 2/1990 |
| JP | 3-186287 A | 8/1991 |
| JP | 07-253774 A | 3/1995 |
| JP | 8-196745 A | 8/1996 |
| JP | 09-081310 A | 3/1997 |
| JP | 11-144061 A | 5/1999 |
| JP | 11-197357 A | 7/1999 |
| JP | 11-305935 A | 11/1999 |

(Continued)

*Primary Examiner*—Mark Sager
(74) *Attorney, Agent, or Firm*—Shinjyu Global IP

(57) ABSTRACT

A game system that allows a player to manipulate a real interface device in a real space and have a representation of the real interface device (i.e., a virtual interface device) be displayed in a virtual space is disclosed. The position of the real interface device in the real space is detected by a position detector and converted into spatial coordinates by a three-dimensional input conversion means at predetermined time intervals. When a player moves the real interface device, a virtual interface device is displayed within the virtual space and moves identically with the real interface device. The virtual interface device is determined to have struck an object in the virtual space (e.g., an enemy) when the coordinates of at least a portion of the object in the virtual space are the same as, or within a predetermined range of, the coordinates of the virtual interface device.

19 Claims, 20 Drawing Sheets

FOREIGN PATENT DOCUMENTS

| | | |
|---|---|---|
| JP | 2000-020193 | 1/2000 |
| JP | 2000-300839 | 10/2000 |
| JP | 2000-308756 A | 11/2000 |
| JP | 2001-70639 A | 3/2001 |

* cited by examiner

Position Selection Screen

Difficulty Level Setting Screen

|     | Q1              | Q2              |
| --- | --------------- | --------------- |
| t1  | (a1, b1, c1)    | (p1, q1, r1)    |
| t2  | (a2, b2, c2)    | (p2, q2, r2)    |
| t3  | (a3, b3, c3)    | (p3, q3, r3)    |
| t4  | (a4, b4, c4)    | (p4, q4, r4)    |
| t5  | (a5, b5, c5)    | (p5, q5, r5)    |
| t6  | (a6, b6, c6)    | (p6, q6, r6)    |
| t7  | (a7, b7, c7)    | (p7, q7, r7)    |
| t8  | (a8, b8, c8)    | (p8, q8, r8)    |
| t9  | (a9, b9, c9)    | (p9, q9, r9)    |
| t10 | (a10, b10, c10) | (p10, q10, r10) |
| t11 | (a11, b11, c11) | (p11, q11, r11) |
| t12 | (a12, b12, c12) | (p12, q12, r12) |
| t13 | (a13, b13, c13) | (p13, q13, r13) |
| t14 | (a14, b14, c14) | (p14, q14, r14) |
| t15 | (a15, b15, c15) | (p15, q15, r15) |
| t16 | (a16, b16, c16) | (p16, q16, r16) |

*Fig. 13*

VIDEO GAME DEVICE, VIDEO GAME METHOD, VIDEO GAME PROGRAM, AND VIDEO GAME SYSTEM

BACKGROUND OF THE INVENTION

1. Field of the Invention

This invention generally relates to video games in which an object moves in a video game space in response to commands from a player.

2. Background Information

Video games in which an object moves in a video game space in response to commands from a player are well know in the prior art. Some examples of these include driving/piloting games in which a player drives a car or pilots an airplane, battle games in which a player battles an enemy by operating battle machines or animated characters that represent the player himself, and sports games in which a player plays a sport by operating an animated character that represent the player himself.

With aircraft piloting video games, for example, a player controls an aircraft by means of up/down and right/left arrow buttons or a controller modeled after an aircraft control stick. Likewise, with battle games a player carries out attacks on an enemy by controlling the movement of a battle machine with the controller or arrow buttons, or with instruction buttons that direct the use of weapons.

With sports video games, video game devices have been offered in which a player plays a soccer game by controlling the movements of an athlete character with arrow buttons or a variety of instruction buttons. For example, a boxing game has been offered in which a player stands in a predetermined position in real space and fits on gloves connected to the game device. The player attacks an opponent displayed on a screen in front of him by thrusting the gloves toward the screen. To defend against attacks from the opponent, the player dodges to the left/right in the predetermined position in real space.

In the driving/piloting games, battle games and soccer games described above, a player presses predetermined buttons or manipulates a bar to control objects within the game space. However, controlling objects by manipulating buttons or bars tends not to be very realistic. To begin with, commands that instruct which object within the game space is to move, and in what direction, are assigned to the buttons and bars in advance. Thus, movement of the objects by means of the buttons and bars is limited by the combinations of action patterns preset in the game.

One aspect of the boxing game described above that increases the enjoyment thereof is that the player's own punching and evading movements have an impact on how the game unfolds. However, this does not mean that the gloves that a player is wearing are displayed as objects within the game space, or that player movements to avoid attacks from the opponent are displayed as objects within the game space. Because of this, a player is not able to visually or physically sense his punch striking the opponent or having eluded the opponent's punch, and thus does not get enough of a true sense of reality in the boxing game.

In other words, a game device has yet to be offered in which players in real space can freely control objects within the game space and thereby feel as though they themselves are in the game space.

SUMMARY OF THE INVENTION

Therefore, an object of the present invention is to allow a player in a real space to play a video game by freely controlling objects within the video game space.

According to one aspect of the present invention, a video game device is provided in which a real interface device operated by a player within a real space is represented by a virtual interface device in a virtual space and displayed on a screen. The game device includes:

position detecting means for detecting the position of the real interface device within the real space;

conversion means for converting the detected real position into a position within the virtual space, and based on the virtual position, determining the position in which the virtual interface device is displayed on the screen; and operating means for displaying movements of the virtual interface device on the screen, which causes the real position to be detected by the position detecting means, and the display position of the virtual interface device to be determined by the conversion means, at predetermined time intervals $\Delta T_1$.

Examples of a virtual interface device include, but are not limited to, a bat, a racket, a golf club, a shield, or an animated character representing the player himself. By making the virtual interface device and the real interface device similar in form, a video game will have a better sense of realism. For example, if the virtual interface device is a sword, the real interface device is preferably shaped like a sword, and if the virtual interface device is shaped like a shield, then the real interface device is preferably shaped like a shield. For the same reason, the virtual interface device and the real interface device are preferably made into similar forms for sports video games, in which the virtual interface device is a bat, racket, golf club, or other type of sports equipment. If the virtual interface device is an animated character, the real interface device could be an object(s) that the player puts on his or her person, e.g., a hat, a pair of gloves, a belt, goggles, or footwear.

The position detecting means includes, for example, light-emitting elements provided in the real interface device, and at least one pair of CCD cameras fixed in predetermined locations. The detected real position of the real interface device is converted into a position in the virtual space in which the game is carried out. The position in which the virtual interface device is displayed on the screen is calculated from the virtual position, and the virtual interface device is then displayed. The position of the real interface device is detected, and the display position of the virtual interface device is calculated, at a fixed interval of, for example, 16 msec. The movement of the real interface device manipulated by a player is accordingly displayed on the screen as the movement of the virtual interface device. For example, if the player were to swing a sword, the sword displayed on the screen would be swung in an identical manner.

It should be noted that there may be a plurality of real interface devices. For example, a fighting game in which a player uses a sword and shield to battle an enemy is made possible in the present invention, as well as a situation in which a group of players jointly fight enemies in the virtual game space.

According to another aspect of the present invention, the position detecting means further specifies three dimensional coordinates for the real interface device in the real space, and the conversion means further converts the real space coordinates into three dimensional coordinates within the virtual space, and based on the virtual space coordinates, determines the position in which the virtual interface device is displayed on the screen.

The position of the real interface device is described with three dimensional coordinates from the position detecting means. For example, the position and direction of the real interface device may be specified by detecting two predetermined real space coordinates. The position of a surface of the real interface device may be specified by detecting three predetermined real space coordinates. For example, when the virtual interface device is a rod-shaped object such as a sword or bat, the position of the real interface device may be detected at two points. In cases in which the virtual interface device has a planar form such as a racket or shield, the position of the real interface device may be detected at three points.

It should be noted that the following method may also be used to detect the position of the real interface device. The real space and the virtual space are respectively divided into real sub-spaces and virtual sub-spaces of predetermined size, and information that identifies each sub-space is then established. The position of the real interface device is specified with real space identifying information, and the real space identifying information is then converted into virtual space identifying information.

According to yet another aspect of the present invention, the position detecting means detects at least two points on the real interface device, and further includes:

intersection display control means that calculates the position in which a straight line that extends between the points intersects with the display, and then displays a marker on the screen that indicates the intersection; and selection accepting means for determining whether or not the intersection and a display object being displayed on the screen overlap, and if so, accepting the selection of the display object.

Take, for example, a situation in which a difficulty level selection menu is displayed. When a predetermined button is pressed while the real interface device is pointing at any one of the displayed difficulty levels, the desired difficulty level will be selected. Likewise, when, for example, a predetermined button is pressed while the real interface device is pointing at a displayed enemy, a preset assault will be executed, e.g., a bullet will be fired, a knife will be thrown, or the like.

According to yet another aspect of the present invention, the game device further includes:

first trajectory storing means for storing the virtual position of the virtual interface device taken at predetermined time intervals $\Delta T_2$ ($\Delta T_2 > \Delta T_1$); and hit determining means for determining the trajectory and speed of the virtual interface device based on the virtual position stored in the first trajectory storing means, and based on the trajectory and speed thereof, determining whether or not an object within the virtual space and the virtual interface device have struck each other, and specifying the object if the two have struck.

The trajectory storing means stores virtual space coordinates measured within, for example, the past 160 msec. The movement of the virtual interface device of the present invention differs from movement directed through a joystick or buttons on a controller in that the direction and speed thereof are unspecified. Therefore, a change in the position of the virtual interface device within a fixed period of time is stored in memory, and the trajectory and speed of the virtual interface device are calculated from this change. Whether or not an object and the virtual interface device within the virtual space have struck each other is determined based upon the calculated trajectory and speed. Furthermore, since the objects are of a variety of types—natural objects such as enemies, trees, bamboo and the like, and man-made objects such as houses, walls and the like—the hit determination means specifies what the virtual interface device has struck.

According to yet another aspect of the present invention, the game device further includes:

second trajectory storing means for storing the virtual position of the virtual interface device taken at predetermined time intervals $\Delta T_3$ ($\Delta T_3 > \Delta T_1$);

command storing means for correlating and storing predetermined trajectory patterns to be taken by the virtual interface device with commands that execute the same; and command execution means for calculating the trajectory of the virtual interface device based upon the virtual positions stored in the second trajectory storing means, determining whether or not the calculated trajectory matches any of the predetermined trajectory patterns, and if so, executing the command that correlates with the matching trajectory pattern.

When the movement of the virtual interface device in the virtual space corresponds with a predetermined pattern, e.g., a "cross move", a command is executed in response to this pattern, e.g., "knock down all enemies within 10 m inside the virtual space".

According to yet another aspect of the present invention, the game device further includes:

third trajectory storing means for storing the real position detected at a predetermined time interval $\Delta T_4$ ($\Delta T_4 > \Delta T_1$), command storing means for correlating and storing predetermined trajectory patterns taken by the real interface device with commands that execute the same; and command execution means for calculating the trajectory of the real interface device based upon the real position stored in the third trajectory storing means, determining whether or not the calculated trajectory matches any of the predetermined trajectory patterns, and if so, executing the command that correlates with the matching trajectory pattern.

If the movement of the real interface device in the real space corresponds with a predetermined pattern, e.g., a "cross move", a command is executed that responds to the pattern, e.g., "knock down all opponents within 10 m inside the virtual space".

According to yet another aspect of the present invention, the game device further includes:

correction means for detecting any difference between the player's height and a predetermined standard height from the position of the real interface device in the real space, and based on the detected difference, correcting the position of the real interface device in the virtual space.

Take, for example, the situation in which a standard height is set to 180 cm. If the player is a child 90 cm in height, the real interface device that the player manipulates would be displayed low on the screen, and thus possibly spoiling the fun of the game for that player. Accordingly, differences in the position and movement of the real interface device created by differences in the height of the player are corrected such that the virtual interface device is displayed identically.

According to yet another aspect of the present invention, the position detecting means further includes:

light emitting means installed in the real interface device;

at least a pair of light detecting means for detecting light from the light emitting means;

and measuring means for measuring the position of the light emitting means based on the detected light and outputting the measurement results to the conversion means.

The light detecting means enables coordinates to be detected on each of the x, y and z axes in a predetermined real space coordinate system. Specifically, the light detecting means employ CCD cameras and photosensors. Examples of the light-emitting means include, but are not limited to, infrared light-emitting elements. Because infrared rays have directionality, the light-emitting means may be formed by employing a plurality of light-emitting elements that emit light in different directions.

According to yet another aspect of the present invention, a video game method is employed in a game device in which a real interface device operated by a player within a real space is represented by a virtual interface device within a virtual space and displayed on a screen. The video game method includes:

a position detecting step for detecting the position of the real interface device within the real space;

a conversion step for converting the detected real position into a position within the virtual space and determining the display position of the virtual interface device on the screen based on its virtual position; and an operating step for displaying the movements of the virtual interface device on the screen by causing the position detecting means to detect the real position of the real interface device, and the conversion means to determine the display position of the virtual interface device, at predetermined time intervals $\Delta T_1$.

According to yet another aspect of the present invention, a video game program is provided that causes a computer to execute each of the steps of the method cited above. Further, computer-readable storage media on which this program is recorded are also included in the scope of the present invention. Examples of computer-readable recording media include, but are not limited to, floppy disks, hard disks, semiconductor memory, CD-ROMs, DVDs, magneto-optical disks (MOs) and other computer read/writeable recording media.

According to yet another aspect of the present invention, a real interface device for a video game device is provided, in which the real interface device is manipulated by a player within a real space and is represented by a virtual interface device within a virtual space. The real interface device includes a light-emitting means disposed thereon that emits light. A position of the real interface device in the real space is detected by a position detecting means disposed on the video game device that detects the light emitted from the light-emitting means and computes the position thereof in the real space. The real position of the real interface device is converted into a virtual position within the virtual space by a conversion means disposed in the video game device, the conversion means displaying the virtual interface device in the virtual position on a display. Movement of the virtual interface device is displayed on the display by an operating means disposed in the video game device, the operating means causing the position detecting means to detect the real position of the real interface device and the conversion means to determine the virtual position of the virtual interface device at predetermined time intervals $\Delta T_1$.

For example, if the real interface device is a rod-shaped object such as a sword or bat, infrared light-emitting elements are mounted in two different spots along the centerline of the real interface device. In cases in which the real interface device has a planar portion, such as with a racket or shield, light-emitting elements are installed in three different spots in the planar section. The real interface device may be an object(s) that the player puts on his or her person, e.g., a hat, gloves, a belt, goggles, or footwear, and that is manipulated by his or her movements. With some of these objects, installing just one light-emitting element may be adequate. Light from the light-emitting elements is detected by at least one pair of light-detecting means made up of CCD cameras or infrared sensors, and the three-dimensional coordinates of the light-emitting means in the real space are calculated.

According to yet another aspect of the present invention, a light-emitting means is disposed on a real interface device for a video game device. The real interface device is manipulated by a player within a real space and represented by a virtual interface device within a virtual space. The light from the light-emitting means is detected by at least a pair of light detection means disposed on the video game device. The position of the light-emitting means in the real space is measured by measurement means disposed on the video game device based upon the light detected by the light detection means. The real position of the real interface device is converted into a virtual position within the virtual space by conversion means disposed on the video game device, the conversion means displaying the virtual interface device in the virtual position on a display. The movement of the virtual interface device is displayed on the display by an operating means disposed in the video game device, the operating means causing a position detecting means disposed on the video game device to detect the real position of the real interface device and the conversion means to determine the virtual position of the virtual interface device at predetermined time intervals $\Delta T_1$.

The light-emitting means is installed in a real interface device that a player manipulates in the game device. The light-emitting means may be installed in an object(s) worn by the player on his or her person, if the real interface device is a pair of gloves, a hat, a belt, footwear, etc.

According to yet another aspect of the present invention, a position detecting means that detects the position of a real interface device that a player of a video game device manipulates within a real space includes:

a light-emitting means installed in the real interface device;

at least a pair of light-detecting means that detect light from the light-emitting means; and measuring means that measures the position of the light-emitting means within the real space based upon the detected light and outputs the measurement results to the game device.

The position detecting means includes a pair of CCD cameras installed, for example, on left and right upper portions of the game device console, and infrared light-emitting elements provided in the real interface device.

According to yet another aspect of the present invention, a video game system is provided that allows a player within a real space to play a video game within a virtual space, the video game system including:

a real interface device for the player to manipulate within the real space;

display means for displaying a virtual interface device, the virtual interface device serving as a representation of the real interface device within the virtual space;

position detecting means for detecting positioning of the real interface device within the real space;

coordinate conversion means for converting the detected real position into a position within the virtual space, and based on the virtual position, determining the display position of the virtual interface device on the display means; and operating means for displaying movements of the virtual interface device on the display means that correspond to movements of the real interface device manipulated by the player by causing the position detecting means to detect the real position, and the coordinate conversion means to determine the display position, of the virtual interface device at predetermined time intervals $\Delta T_1$.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 13 is a trajectory table that indicates the trajectory of the sword object in the combat video game device illustrated in FIG. 2;

DETAILED DESCRIPTION OF THE PREFERRED EMBODIMENTS

1. Overview of the Invention

In the present invention, the movement of a real interface device that a player controls within a real space R is displayed as the movement of a virtual interface device within a game space G. For example, in combat video games in which a player takes up a sword and battles with an enemy, the swinging and thrusting movements of the sword wielded by the player are converted into and displayed as the movements of a sword object within the game space G. As a further example, in a situation where a player plays a tennis game within the game space G, the movements of the racket wielded by the player are converted into and displayed as the movements of a racket wielded by an animated character that represents the player within the game space G.

The present invention is also applicable to video games other than combat and sports games. For example, a game in which points are scored by having an animated character within the game space G jump to avoid obstacles is also made possible by the present invention. In order to convert the player's own movements into the movements of the animated character, the player may be asked to put on a hat, footwear, goggles, a belt, gloves, or other type of device, and the object(s) worn may serve as the real interface device(s).

2. First Embodiment

A. Configuration of the Game System

Figure 1:
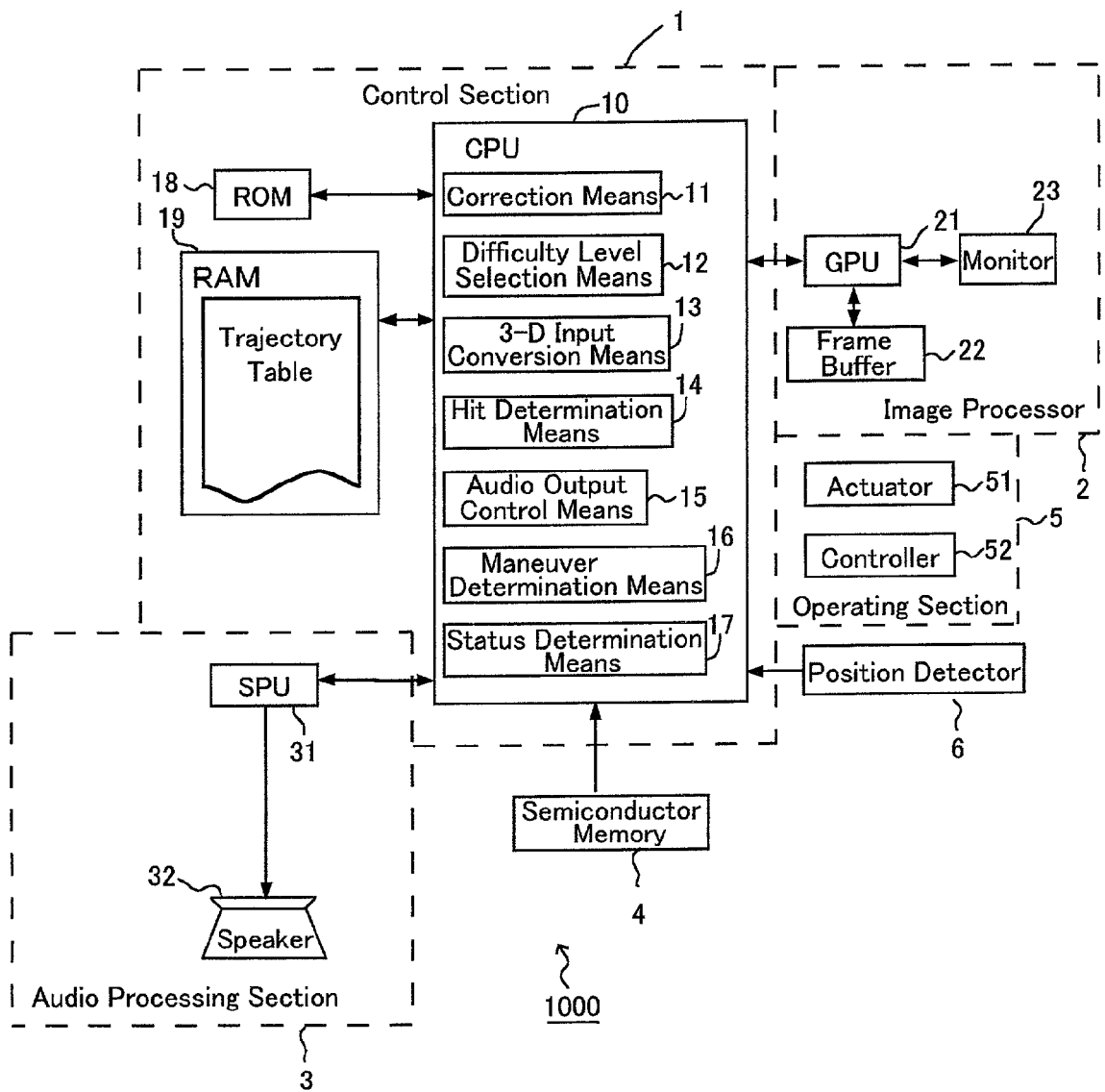
FIG. 1 is a block diagram illustrating the configuration of a video game system according to a first embodiment of the present invention.

FIG. 1 is a block diagram illustrating a game system 1000 according to a first embodiment of the present invention. The game system 1000 includes a control section 1, an image processor 2, an audio processor 3, a semiconductor memory 4, an operating section 5, and a position detector 6.

The control section 1 includes a CPU 10, ROM 18 and a RAM 19. The CPU 10 conducts a number of functions based on an operating system (OS) stored in the ROM 18 and on game data stored in the RAM 19. These will be described in greater detail below. The OS stored in ROM 18 controls each portion of the game system 1000, and the RAM 19 is used as a work area that temporarily saves various game data which is read out from the semiconductor memory 4 as needed.

The image processor 2 includes a GPU (graphics processing unit) 21, a frame buffer 22, and a monitor 23. Based on calculations made by the CPU 10, the GPU 21 writes CG images made up of polygon combinations into the frame buffer 22, and are stored in the frame buffer 22 temporarily. The CG images stored in the frame buffer 22 are read out and displayed by the monitor 23. Continuous processing and storing of CG images into the frame buffer 22 by the GPU 21 results in the display of an animated CG image on the monitor 23.

The audio processor 3 includes an SPU (sound processing unit) 31 and a speaker 32. The SPU 31 plays music and sound effects based upon music data and a variety of sound effects data.

Game programs are recorded in the semiconductor memory 4.

The operating section 5 includes a real interface device 51 and controllers 52. The real interface device 51 is an input means that a player manipulates within the real space R. The position detector 6 measures the position of the real interface device 51 in the real space R, and the measurement data therefrom is used to move a virtual interface device within the game space G such that the virtual interface device is a transposition of the real interface device 51. In addition, the real interface device 51 may also be utilized both as an input means and an output means. For example, if the real interface device 51 is provided with a vibration means, and the virtual interface device collides with an object within the game space G, the vibration means in the real interface device 51 could be made to vibrate in response thereto. The controllers 52 are preset switches, buttons, joysticks, foot pedals, and other similar control members. The controllers 52 are input means for controlling objects and/or the virtual interface device within the game space G, and are manipulated by the player.

As noted above, the position detector 6 is a means for detecting the position of the real interface device 51 in the real space R. The position detector 6 employs, for example, light-emitting means installed in the real interface device 51 and a pair of sensors for sensing light emitted from the light-emitting means. The position detector 6 further includes a measurement unit that determines the position of the real interface device 51 in the real space R, based upon the light emitted from the light-emitting means, and sends this position data to the control section 1. The position data sent to the control section 1 is, for example, expressed in three-dimensional coordinates in the real space R, numbers representing sub-spaces subdivided from within the real space, or another type of coordinate system known to one of ordinary skill in the art.

Instead of the aforementioned light-emitting means, it is also possible to utilize ultrasound signal-emitting means installed in the real interface device 51, together with a pair of sensors that receive sound from the ultrasound signal-emitting means.

B. An Example of A Game System

Figure 2:
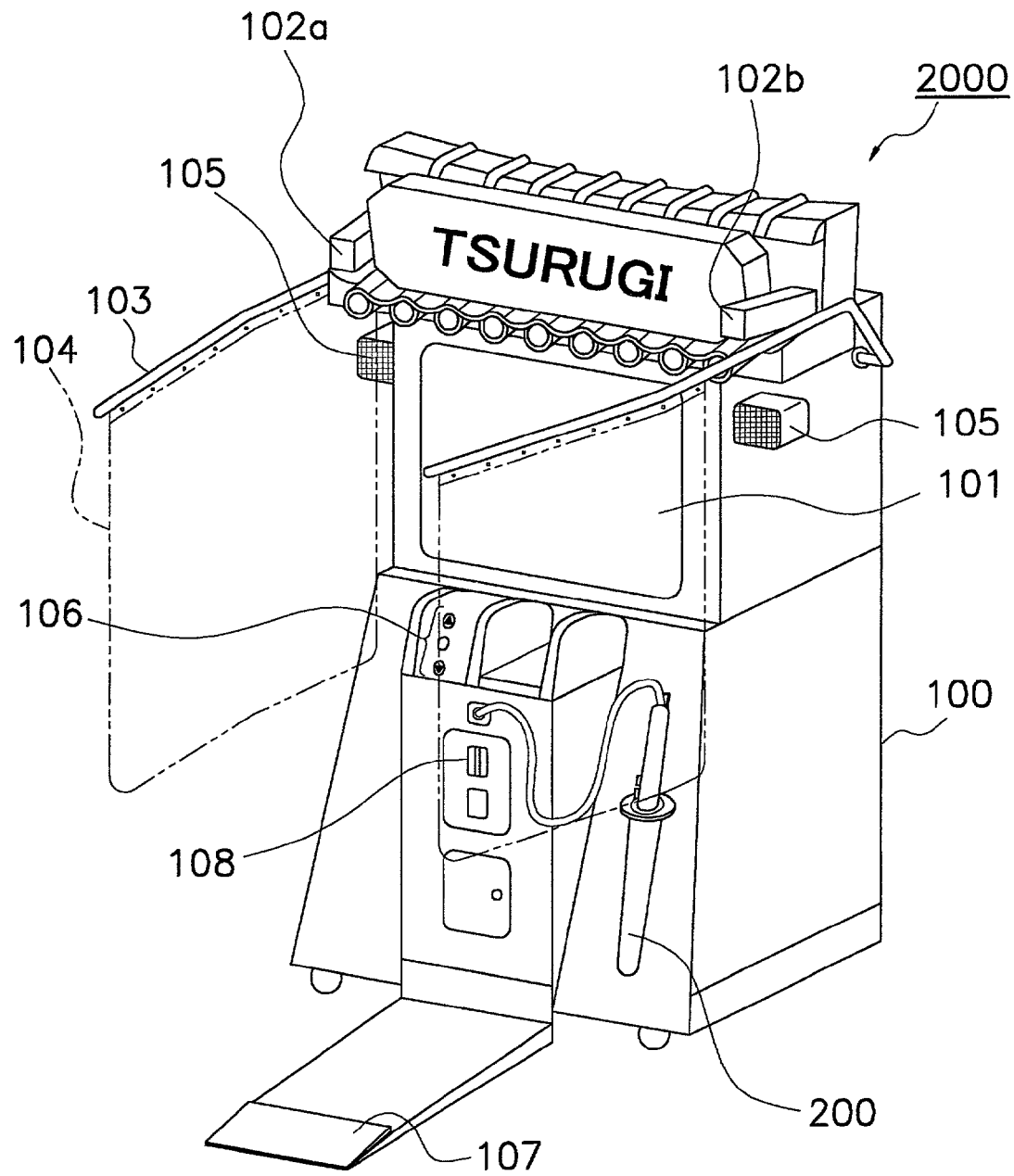
FIG. 2 is an oblique view of the outward appearance of a combat video game device which employs the video game system illustrated in FIG. 1.

FIG. 2 is an oblique view of the outward appearance of a combat video game system 2000 in which the foregoing game system 1000 is employed, and illustrates one example in which the present invention is applied to a combat video game. The combat video game system 2000 includes a game device 100, and a sword type of interface device 200 (hereinafter referred to as "sword 200") that serves as one example of a real interface device 51. The sword 200 is connected to the game device 100 by an RS232C connection or other similar type of connector. A cable supplying power from the game device 100 is also connected to the sword 200. Note, however, that it would be readily apparent to one of ordinary skill in the art that the sword 200 could be powered by an independent power source (such as a battery pack), and that the sword 200 could be configured to be connected to the game device 100 via any one of a number of wireless connections available on the market.

A monitor 101 for image output is provided on the upper front upper portion of the game device 100 console. CCD cameras 102a and 102b, which are only one example of sensors included in the position detector 6, are installed on the left and right uppermost portions of the console. The CCD cameras 102a and 102b detect light from the light-emitting means installed in a predetermined location on the sword 200. Although not shown in the figure, a position measurement means is connected to the CCD cameras 102a and 102b, and specifies the light-emitting positions in the real space R based on the light detected by the CCD cameras 102a and 102b. A pair of bars 103 project out of the left and right sides of the rear upper portion of the console and extend forward therefrom, and protective curtains 104 are installed on the bars 103. The protective curtains 104 serve to protect the area surrounding the game device 100 when a player is brandishing the sword 200 in the play space. Speakers 105 (which are examples of the speaker 32 depicted in FIG. 1) are installed on both the left and right sides of the upper portion of the monitor 101, and serve to output game background music and sound effects to the player. Switches 106 are provided in the middle of the lower portion of the console, and allow the player to select menus that are displayed on the monitor 101. The switches 106 are one specific example of the controllers 52 described above. A foot pedal 107 is provided at floor level on the front of the console. By stepping on the foot pedal 10, a player is able to manipulate a sword object that represents the sword 200 in the game space G. The foot pedal 107 is another specific example of the controllers 52 described above. A coin deposit slot 108 is provided in the middle of the lower portion of the console, and serves to accept coins inserted by the player in order to pay for the game.

B-1. The Game Device

Figure 3:
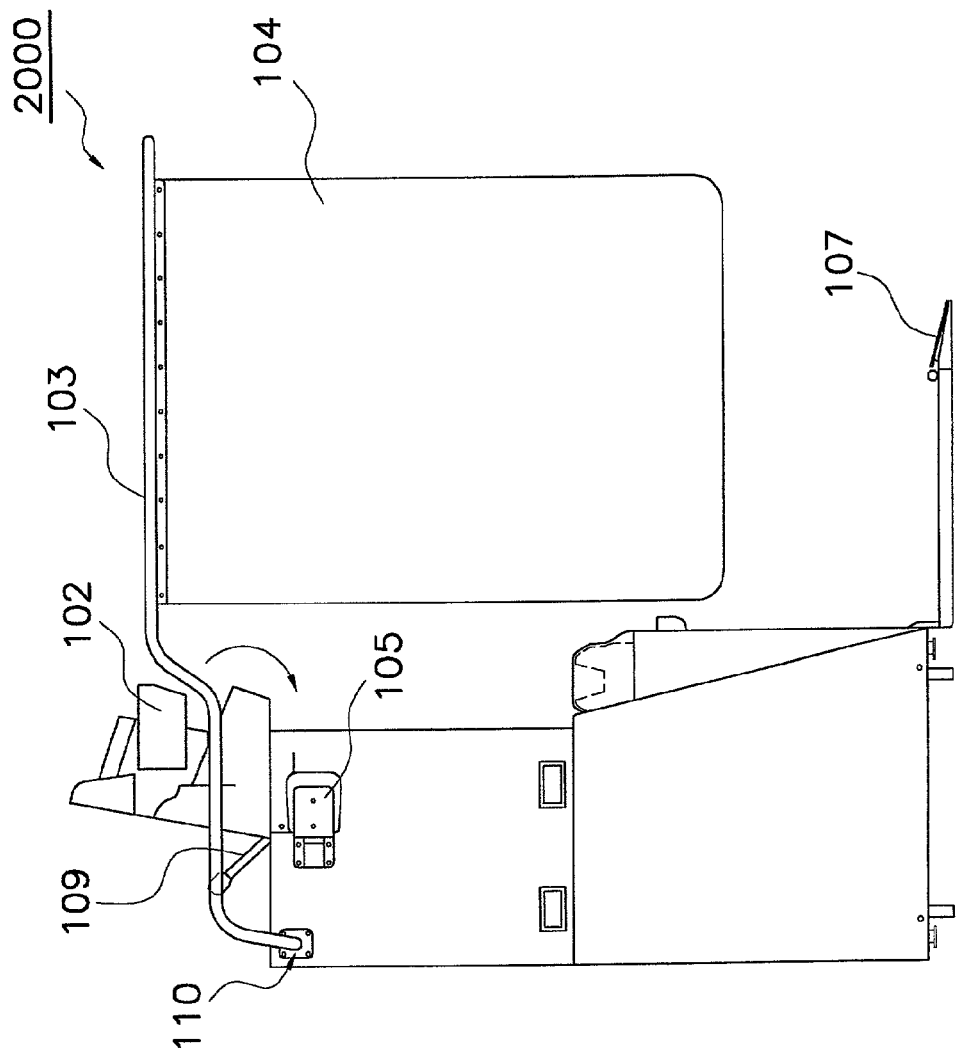
FIG. 3 is a lateral view of the combat video game device illustrated in FIG. 2.

FIG. 3 is a lateral view of the game device 100 shown in FIG. 2. As this figure shows, the bars 103 are rotatably installed on fulcrums 110 in the rear of upper part of the console, and project forward horizontally from the fulcrums 110. Gas springs 109 are fitted to the bars 103, and through the extension/compression thereof, the bars 103 are rotatable around the fulcrums 110 within a fixed range in the direction of the arrow in the figure. Even on the rare instance that someone was to dangle from the protective curtains 104, the protective curtains 104 are prevented from coming off the bars 103 because the bars 103 are rotatably installed on the console.

B-2. The Sword

Figure 4:
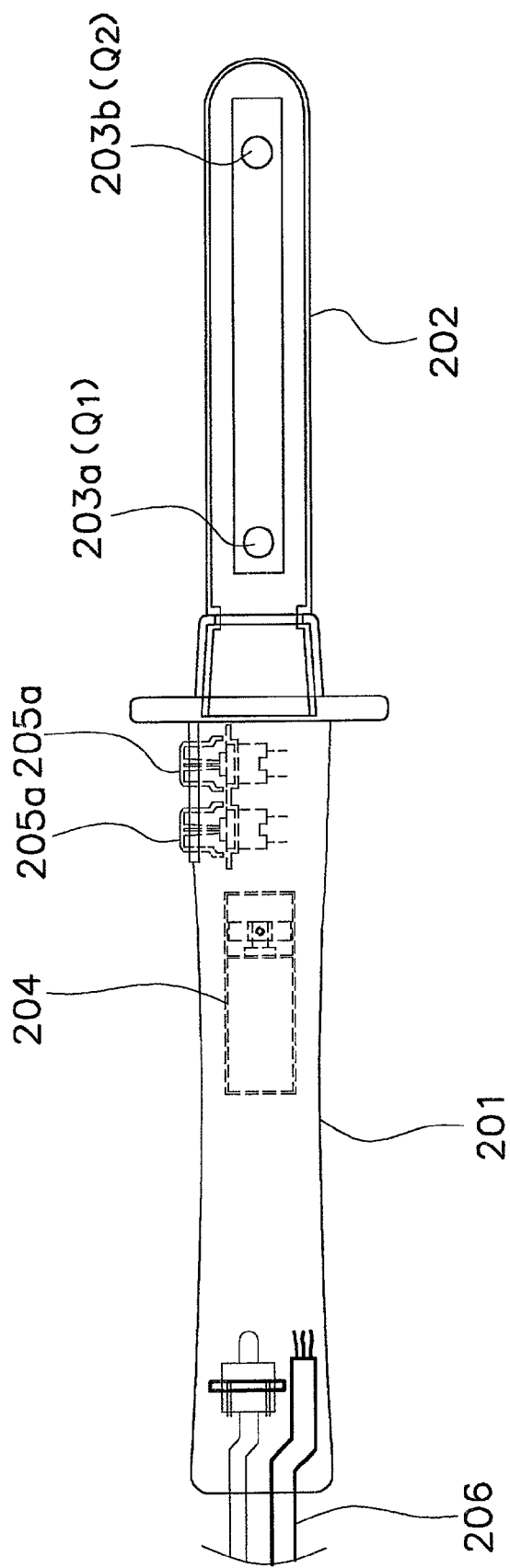
FIG. 4 is a sword type of interface device used in the combat video game device illustrated in FIG. 2.

FIG. 4 shows the detailed structure of the sword 200. The sword 200 includes a grip 201 and a blade 202. The blade 202 is composed of a clear plastic. Two light-emitting means 203a and 203b are installed in the interior of the blade 202 at two predetermined points $Q_1$ and $Q_2$ that are in different positions along the axial direction. Light from the light-emitting means 203a and 203b is detected by the CCD cameras 102a and 102b respectively. The light-emitting means 203a and 203b are not particularly limited, but may for example include LEDs that emit infrared light. Because of the directionality in the orientation of the light emitted from LEDs, the light-emitting means is preferably composed of a plurality of LEDs.

A vibrating means 204 for vibrating the sword is provided in the interior of the grip portion 201. The vibrating means 204 may be composed of an eccentric cam and a motor for rotating the eccentric cam. As will be described later in greater detail, when the sword object in the game space G is determined to have struck an enemy or another object, the motor will be driven to rotate the eccentric cam, which in turn vibrates the sword 200. By adjusting the interval of the motor drive pulse, the rotational speed of the eccentric cam may be controlled to strengthen and/or weaken the vibration. Further, switches 205a and 205b are provided on the grip portion 201. The switches 205a and 205b are utilized to select from menus that appear on the monitor 101. In addition, a cable 206 that transmits electric current to drive the aforementioned motor, and a cord for hanging the sword 200 on the main unit, are both provided in the grip portion 201.

C. Overview Of The Combat Game

Figure 5:
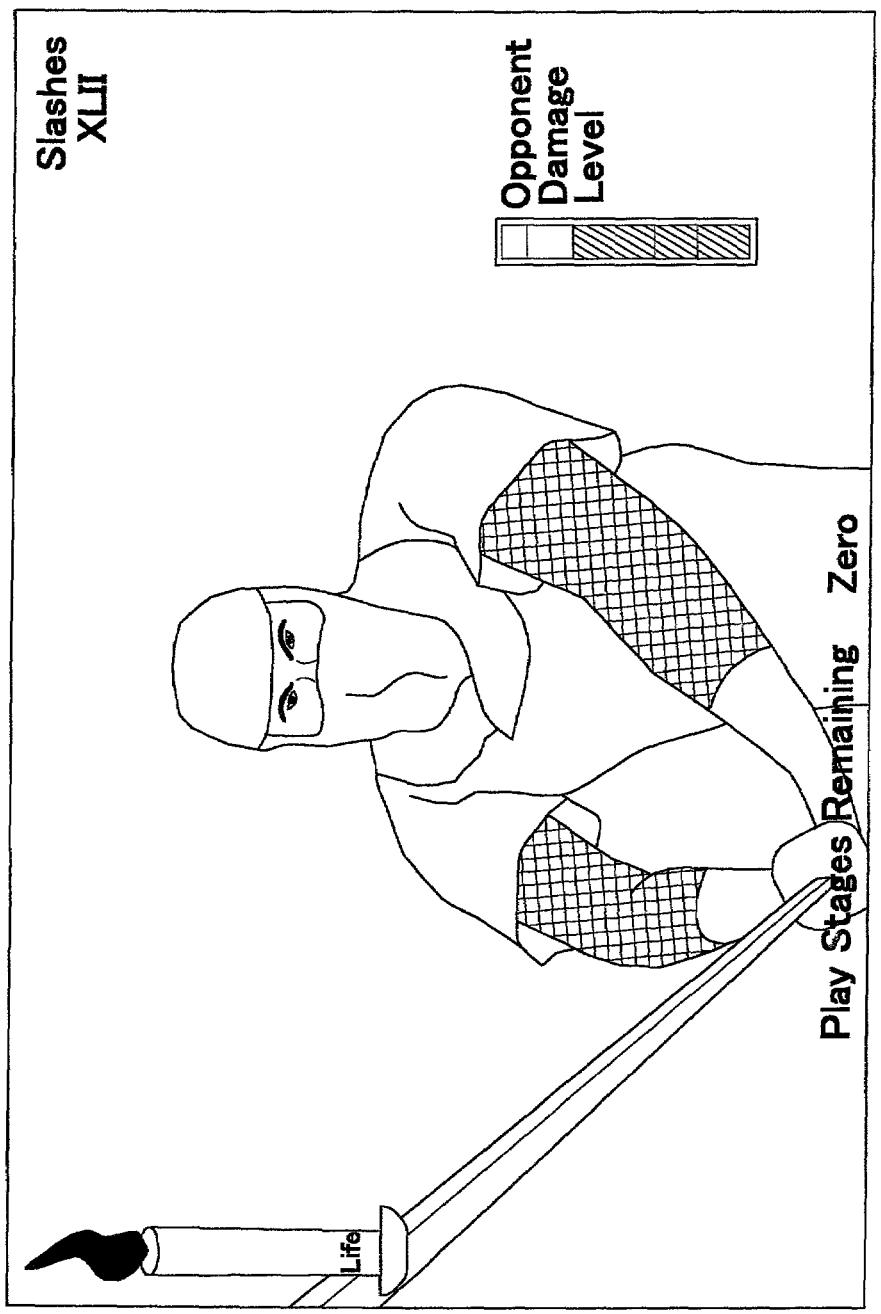
FIG. 5 is an example of a screen displayed in the combat video game system illustrated in FIG. 2.
Figure 6:
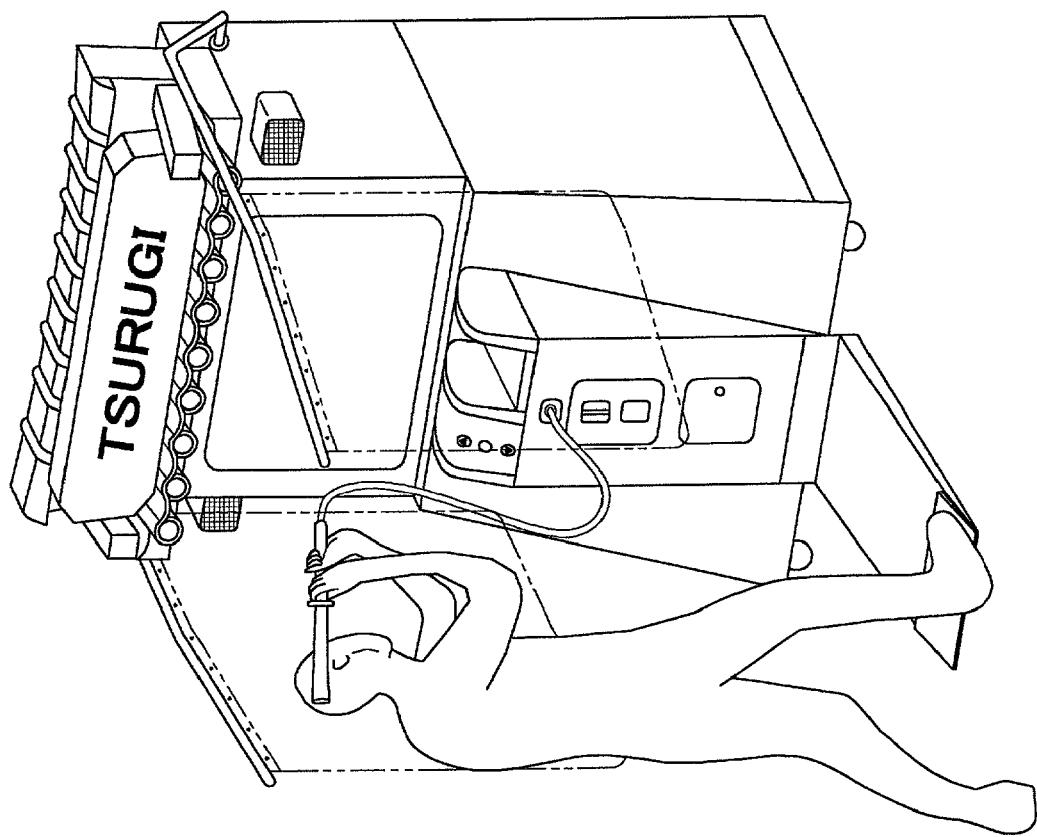
FIG. 6 shows a player playing the combat video game device illustrated in FIG. 2.

Next, an overview of a combat video game played on the combat video game system 2000 will be explained using FIGS. 1 and 5 through 18. FIG. 5 is a scene from the combat video game, and FIG. 6 shows a player playing the combat video game. In this video game, enemies holding weapons such as swords appear in succession and assail the player. Utilizing the sword 200 connected with the game device 100, the player, as shown in FIG. 6, swings and thrusts the sword 200 in order to control the sword object within the game space G. As noted above, the sword object is a transposition of the sword 200 within the game space G. The player's score and a candle that signifies the amount of life remaining in the player are displayed in the upper left portion of the screen. The amount of life left for the enemy is displayed in the lower right portion of the screen.

Prior to beginning the game, the player may select the level of difficulty, and may also select a weapon, e.g., a knife, a spear, or a bow and arrows, in accordance with the level of difficulty. The player advances and turns from one direction to another within the game space G by controlling the game system. Furthermore, by stepping on the foot pedal 107, the player may move ahead a fixed distance in a predetermined direction within the game space G. When the player inflicts a predetermined amount of damage on the enemy by knocking down foes encountered while moving within in game space G, the selected level of difficulty ends, and the player may then choose to move onto a higher level of difficulty. The game ends once the player's remaining life is gone.

C-1. Coordinate Conversion

Figure 7:
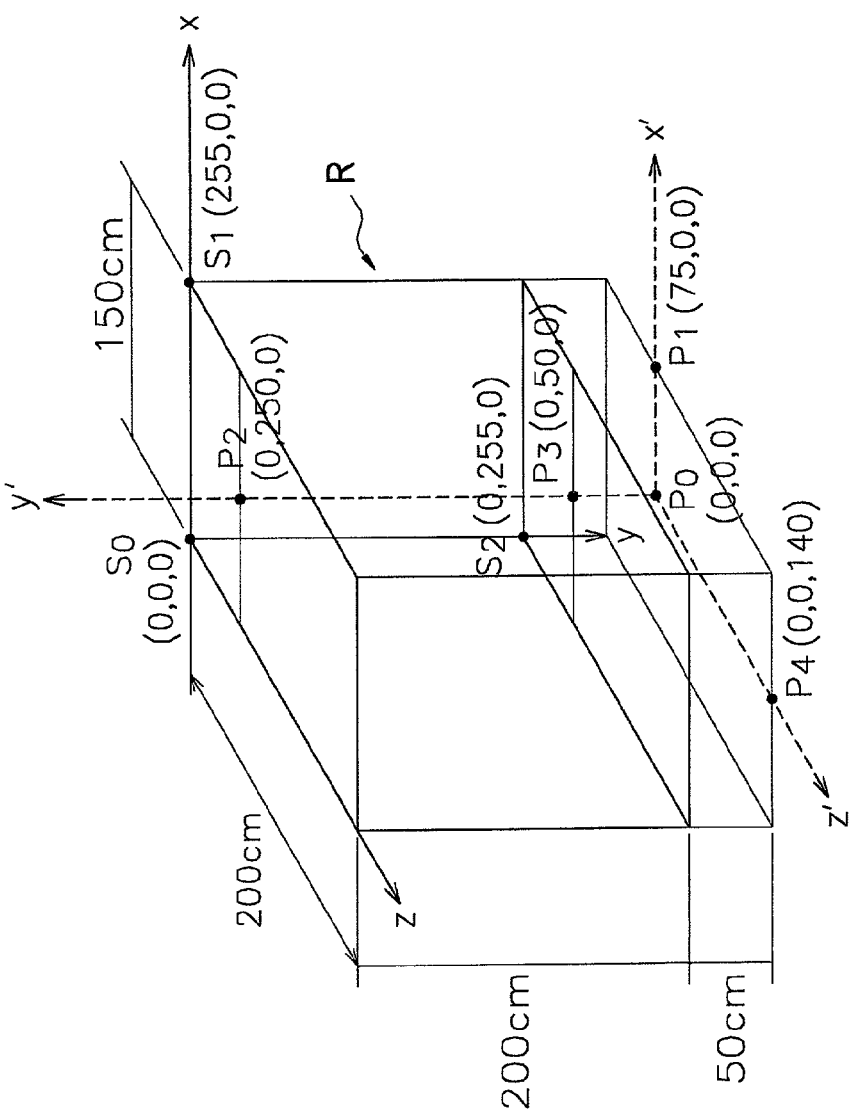
FIG. 7 shows the relationship between a sensor coordinate system and a player coordinate system in the combat video game device illustrated in FIG. 2.
Figure 8:
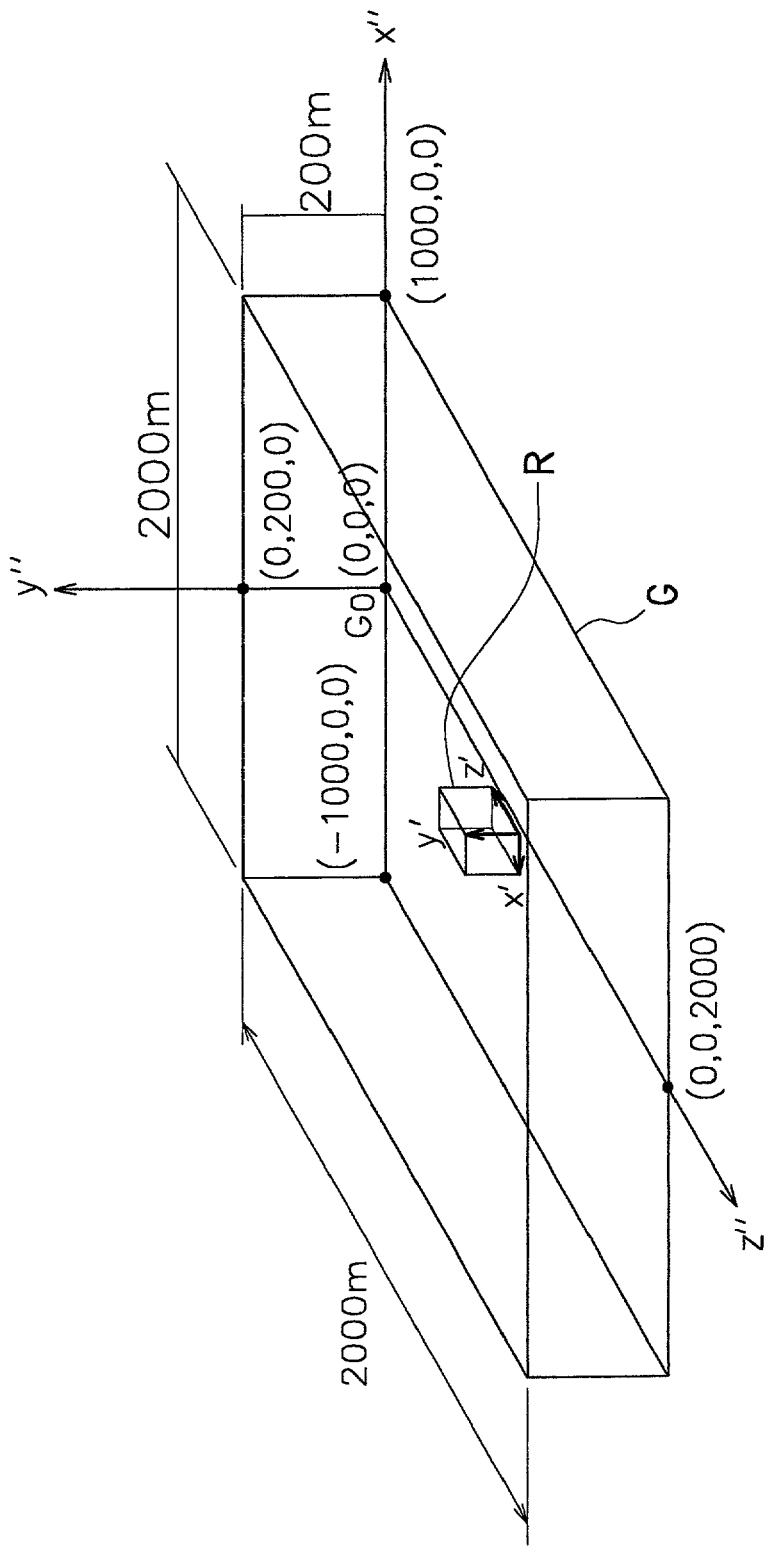
FIG. 8 shows the relationship between the player coordinate system and a game space coordinate system in the combat video game device illustrated in FIG. 2.

FIGS. 7 and 8 show the coordinate conversion concept that forms the foundation of the present combat video game. Three spatial coordinate systems are assumed in the present video game system. The first is a sensor coordinate system that utilizes the CCD cameras 102a and 102b as references to establish the position of the sword 200 within the real space R with three-dimensional coordinates. The second is a player coordinate system that utilizes the player as a reference to establish the position of the sword 200 within the real space R in three dimensional coordinates. The third is a game space coordinate system that establishes the position of the sword 200 within the game space G in three dimensional coordinates.

C-1—1. Conversion From A Sensor Coordinate System Used In The Real

Space R To A Player Coordinate System

FIG. 7 shows the relationship between the sensor coordinate system and the player coordinate system. A cuboid whose boundaries are detectable with the CCD cameras 102a and 102b is assumed as the real space R. The cuboid assumed as the real space R in the present example hovers 50 cm from the floor surface on which the game device 100 is placed, and extends up to the CCD cameras 102a and 102b disposed on the front of the game device 100. The height of the cuboid is 200 cm, the depth is 200 cm, and the width is 150 cm. The size of the cuboid is set to be within the sensing capability of the CCD cameras 102a and 102b, and to be large enough to accommodate a player's movements.

The sensor coordinate system will be explained first. The sensor coordinate system is a system of coordinates in which a vertex So corresponding to CCD camera 102a is the origin, an imaginary line that extends from the CCD camera 102a to the CCD camera 102b is the x-axis, an imaginary line that extends down from the CCD camera 102a is the y-axis, and an imaginary line that extends out from the front of the game device is the z-axis. Each edge of the cuboid representing the real space R in the sensor coordinate system is divided into 256 spaces, whose coordinates are expressed as values from 0 to 255. For example, the coordinates of the vertex $S_1$, which corresponds to CDD camera 102b, will be (255, 0, 0) in this system.

Next, the player coordinate system will be explained. In this example, the origin $P_0$ in the player coordinate system is a position on the foot pedal 107 further toward the front of the game device than the CCD cameras 102a and 102b. Assume for example that the foot pedal 107, at the front of the game device 100, is on the floor surface 60 cm further to the front of the game device than CCD cameras 102a and 102b. Then, an x-axis and a z-axis extend in the same respective directions as the x-axis and z-axis in the foregoing sensor coordinate system, while a y-axis extends upward in a direction opposite that of the y-axis. Each coordinate axis is scaled with 1 cm increments. In this player coordinate system, the coordinates of a point $P_3$ where the y-axis intersects with the lower plane of the real space R will be (0, 50, 0). Likewise, the coordinates of a point $P_2$ where the y-axis intersects with the upper plane of the real space R will be (0, 250, 0).

As an example in which sensor coordinates are converted into player coordinates, consider the origin $S_0$ in the sensor coordinate system. The sensor coordinate system origin $S_0$ (0, 0, 0) will be expressed as (−75, 250, −60) in the player coordinate system.

C-1-2. Conversion From The Player Coordinate System To The Game Space Coordinate System FIG. 8 shows the relationship between the player coordinate system and the game space coordinate system. The game space G is a virtual space in which the video game is played, such as a virtual building, a virtual forest, or other area, and is a predetermined size that is set by the video game supplier. A hypothetical game space G might be a cuboid 2000 m wide, 2000 m deep and 200 m high, for example. Taking the origin $G_0$ (0, 0, 0) to be in the middle of one of the lower edges of the cuboid, an x-axis extends along the lower edge of the cuboid in which the origin $G_0$ is placed, a z-axis extends perpendicular to the x-axis and along the bottom of the cuboid, and a y-axis extends upward perpendicular to the x-axis and the z-axis. Each coordinate axis is scaled with 1 m increments.

The relationship between the player coordinate system and the game space coordinate system is that the y-axis and the y-axis extend in the same direction, while the x-axis and the x-axis, and the z-axis and the z-axis, both extend in a parallel, but opposite, direction with respect to each another.

The origin $G_0$ in the game space coordinate system and the origin $P_0$ in the player coordinate system are the same when the game starts. Thereafter, when the player moves forward to press on the foot pedal 107, or when the player advances or turns, the origins in the game space coordinate system and the player coordinate system gradually diverge. When the two origins are equal, the coordinates (−75, 250, −60) in the player coordinate system, which is the origin $S_0$ in the sensor coordinate system, will be (75, 250, 60) in the game space coordinate system. It should be noted that the conversions described above for the coordinate systems are no more than a single example, and the coordinate system conversions can be generally performed utilizing a known method as an affine transformation.

In the present combat video game system 2000, the positions of the two points $Q_1$, $Q_2$ on the sword 200 in the real space R are specified in the sensor coordinate system, and these coordinates are subsequently converted into the player coordinate system and further into the game space coordinate system. The display position of the sword object on the monitor 101 is determined by making a perspective-projection transformation of the coordinates in the game space coordinate system, and the sword object is then displayed. This coordinate conversion allows a player to play a game without sensing incongruity between real space and the game space, by allowing him to move his body rather than just manipulating an object in the game space.

C-2. Processes Performed By The CPU

Referring again to FIG. 1, the process which the CPU 10 performs will now be explained. The CPU 10 includes correction means 11, difficulty level selection means 12, three dimensional input conversion means 13, hit determination means 14, audio output control means 15, maneuver determination means 16, and status determination means 17.

The correction means 11 performs a process that corrects for differences in player height. For example, the standard height of a player is assumed to be 170 cm. When the player is a child who is shorter than 170 cm, the correction means 11 performs a correction process to prevent the sword object from being awkwardly displayed only at the bottom of the screen.

Figure 9:
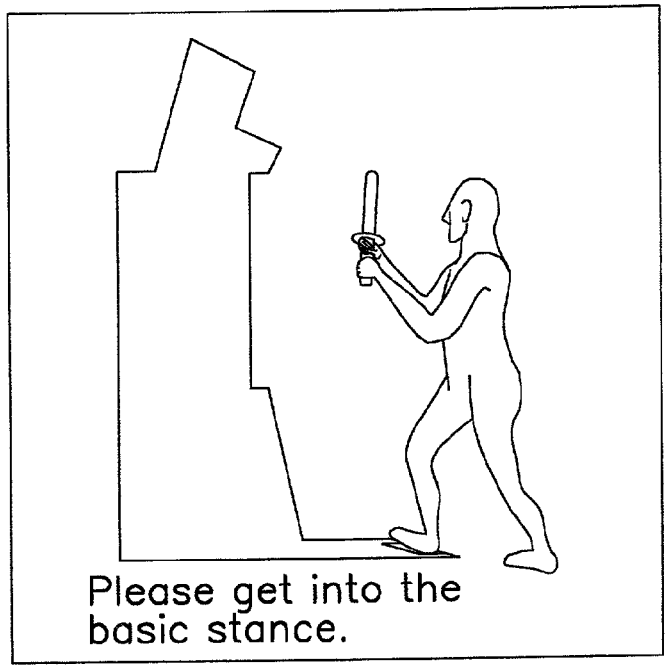
FIG. 9 is an example of a screen displayed in the combat game device illustrated in FIG. 2 that prompts a player into a standard position.

Specifically, prior to the start of the game the correction means 11 prompts the player into a basic stance. FIG. 9 is an example of a screen that the correction means 11 displays in order to prompt the player into this stance. The correction means 11 deduces the player's height based upon the position of the sword 200 when in this stance, and determines a correction coefficient. For example, the correction means 11 assumes 120 cm to be the standard height of the sword 200 when the player is in the basic stance. If the height of the sword 200 detected from a player in the basic stance is 60 cm, i.e., half the standard height, the correction means 11 determines the correction coefficient to be "2." From then on, the correction means 11 multiplies the detected height of the sword 200 by the correction coefficient 2, enabling the same display effects to be produced as with that of a standard player, even for small children. In fact, depending on the height of the player, it is also possible to use the different movements of the sword 200 to determine the correction coefficient. Specifically, the movement of the sword 200 is expressed by the change in the combination of its previous positions and the direction in which it is traveling. Thus, for example, a method can be provided that computes the correction coefficient from distributions in the range of travel of the sword 200.

Figure 10:
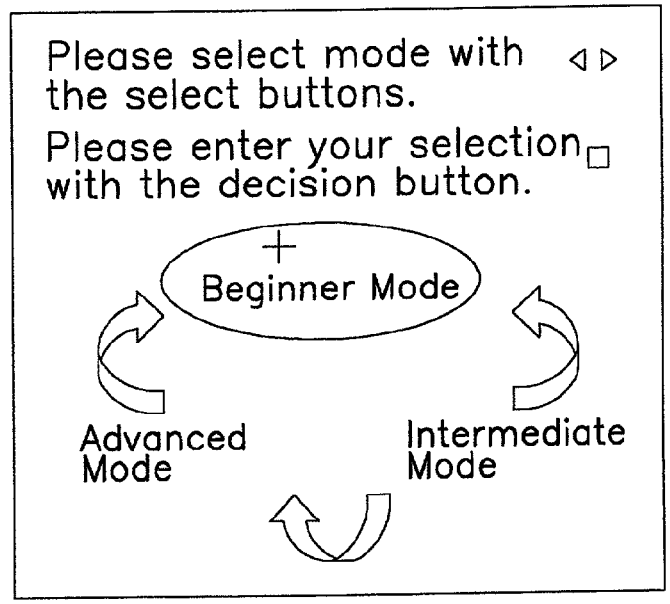
FIG. 10 is an example of a difficulty level selection screen displayed in the combat video game device illustrated in FIG. 2, in which the level of difficulty is selected with the sword type of interface device.

After, or prior to, the determination of the correction coefficient by the correction means 11, the level of difficulty of the game can be selected with the difficulty level selection means 12. The selection of a weapon in accordance with the level of difficulty can also occur while selecting the level of difficulty, or it can occur after the level of difficulty has been selected. The difficulty level selection means 12 utilizes the switch 106 installed in the game device 100, and the switch 205 on the sword 200, in order to accept the difficulty level selection from the player. In addition, when a player points the sword 200 at a menu on the monitor 101 that he or she has selected, the difficulty level selection means 12 displays a marker where a line that extends from the straight line joining the light-emitting means 203a and 203b intersects the monitor 101. The difficulty level selection means 12 will then select the menu in which the marker is placed when the player presses the switch 205. FIG. 10 is an example of a difficulty level selection screen that the difficulty level selection means 12 displays. A marker indicating where the sword 200 is aimed is displayed on the menu item titled "Beginner Mode."

The three dimensional input conversion means 13 carries out a coordinate transformation process that converts the sensor coordinates of the light-emitting means 203a and 203b in the sword 200 into player coordinates, and then into game space coordinates. Display of the sword object is carried out by computing its display position on the monitor 101 based on the game space coordinates calculated. The three dimensional input conversion means 13 performs the coordinate transformation process at predetermined time intervals, e.g. every 16 msec. Accordingly, the movement of the sword 200 controlled by a player is thereby expressed as the movement of a sword object displayed on the monitor 101. This enables a player to play the video game the feeling that they themselves are acting in it, rather than just feeling that they are controlling a sword object in the game.

Figure 11A:
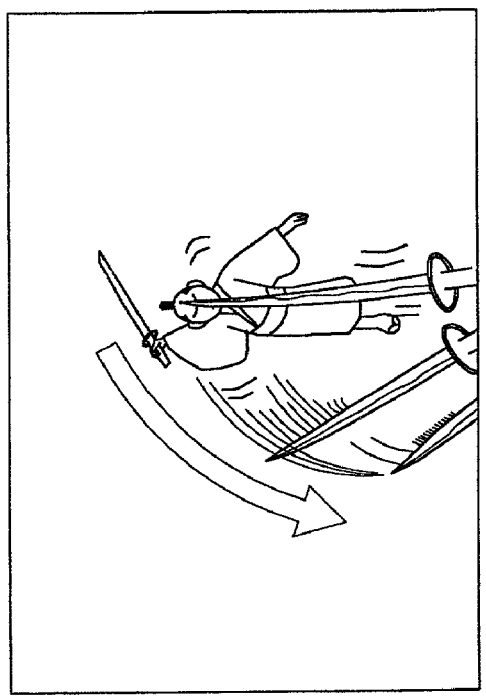
FIGS. 11A and 11B show the relationship between movement of the sword type of interface device and movement of the sword object in the combat video game device illustrated in FIG. 2.
Figure 11B:
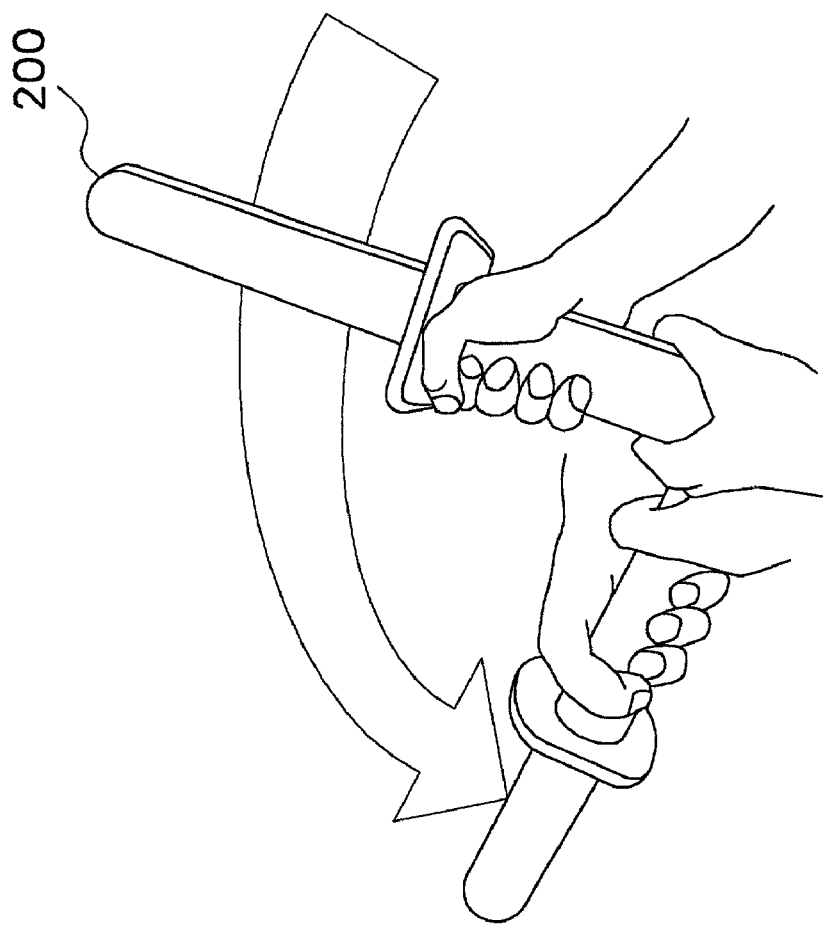
Figure 12A:
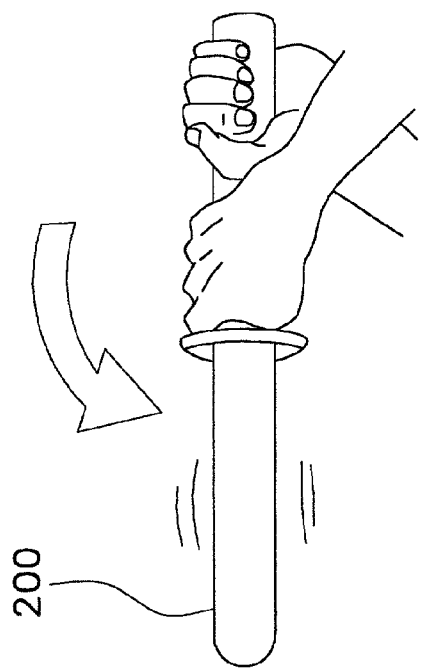
FIGS. 12A and 12B show the relationship between movement of the sword type of interface device and movement of the sword object in the combat video game device illustrated in FIG. 2.
Figure 12A:
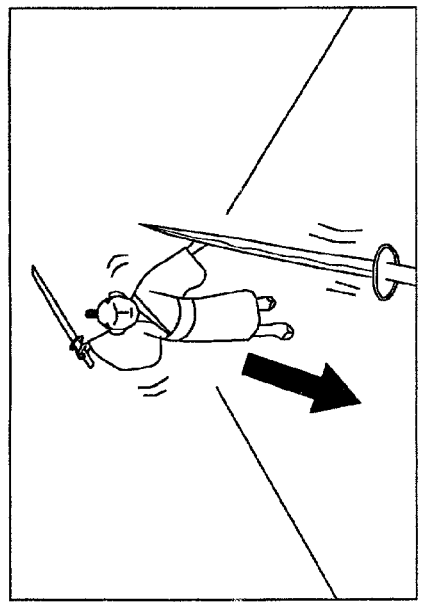
Figure 12B:
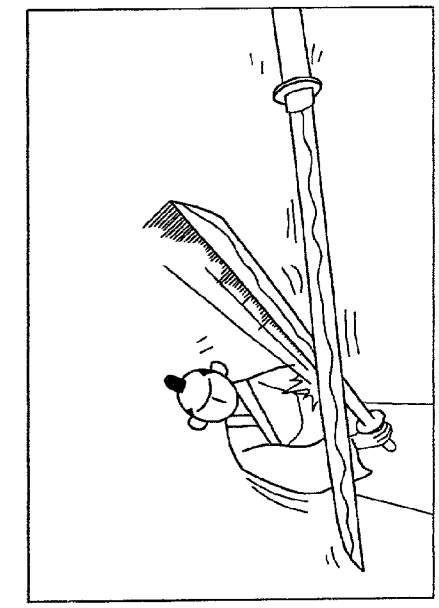

If for example a player has swung the sword 200 as shown in FIG. 11B, the same movement of the sword object will displayed on the screen, as illustrated in FIG. 11A. Moreover, as shown in the same FIG. 11A, the trajectory of the sword object will also displayed. Likewise, as shown in FIGS. 12A and 12B, when an enemy appears and makes an attack on the player, if the player acts to stop the enemy's sword using the sword 200, the sword object in the display will move in the same manner.

The hit determining means 14 determines whether or not the sword object has struck an enemy or another object such as a rock or other object within the game space G. In the present game system, because the movements of the sword object controlled by the player are arbitrary and thus cannot be predicted by the system, the hit determining means 14 stores the sword object's trajectory over a predetermined time period t in order to determine whether or not the sword object has struck another object and what that object is.

FIG. 13 is a trajectory table in which the coordinates of two game space points q1, q2 on the sword object are stored in a time series. The two game space points q1 and q2 correspond to the two points $Q_1$ and $Q_2$ on the sword 200. The three dimensional input conversion means 13 converts the coordinates of the two points $Q_1$ and $Q_2$ on the sword 200 that are taken every 16 msec, into game space coordinates q1, q2 for the sword object. The trajectory table then stores the coordinates of the two game space points q1, q2 taken over the previous 256 msec in the RAM 19.

Based on the coordinates of the two game space points q1, q2 for the sword object, the hit determining means 14 can establish a straight line that represents the blade of the sword object. In addition, assuming the point q1 is at the base of the blade, and the point q2 is near the tip of the blade, the tip of the blade can also be established with a point q3. The point q3 of the blade is a point in line with points q1 and q2, and a fixed distance d further along the blade from point q2. Utilizing the trajectory table, the hit determining means 14 will calculate a plane that expresses the linear trajectory of the blade. The hit determining means 14 determines whether or not the sword object has struck anything by determining whether or not an enemy's sword, an enemy's body, or another object is within the plane calculated.

In addition, the hit determining means 14 determines the speed of the sword object by measuring the distances that points q1 and q2 have traveled every 16 msec. In accordance with the speed of the sword object, the hit determining means 14 will determine how deep it has entered an object. Furthermore, the hit determining means 14 will also determine the degree to which the sword object has struck another object. For example, the hit determining means 14 will rate the hit as "cut clothing only", "body cut", "slashed to the bone" or will determine that the attack has missed altogether.

Note that when the sword 200 moves very quickly, there will be times when the stored sword object coordinates will not overlap with another object. It may happen that, for example, the sword object at time $T_1$ is on the left side of an enemy, and at time $T_2$ is on the right side of the enemy. In this sort of situation as well, the hit determining means 14 will determine that a hit has been made from the trajectory of the sword object blade.

In accordance with the results of the hit determination, the audio output control means 15 will output sound effect data to the speaker 32 that was read out from the semiconductor memory 4 to the RAM 19. The sound effects can include, but are not limited to, the sound of the sword striking another sword, the sound of the sword ripping an enemy's clothes, and the sound of the sword swishing as it misses. Because the sound effects vary with the results of the hit determination, the realism of the game is improved.

The maneuver determining means 16 determines whether or not a prescribed command has been input based on the trajectory of the sword object. The prescribed commands are input according to predetermined trajectory patterns of the sword object and attacks on the enemies. The prescribed commands and the predetermined trajectory patterns are stored in the RAM 19 (and are not illustrated in the figures). For example, based on the foregoing trajectory table, the maneuver determining means 16 determines whether or not a player has input a cross pattern, i.e., one that is intended to kill the opponent. If this pattern has been input, an attack corresponding to the cross pattern is executed. Thus, the player can have an even greater feeling that he himself is participating in the game.

Figure 14A:
FIGS. 14A, 14B and 14C show the changes in the display when the foot pedal on the combat video game device illustrated in FIG. 2 is pressed.
Figure 14B:
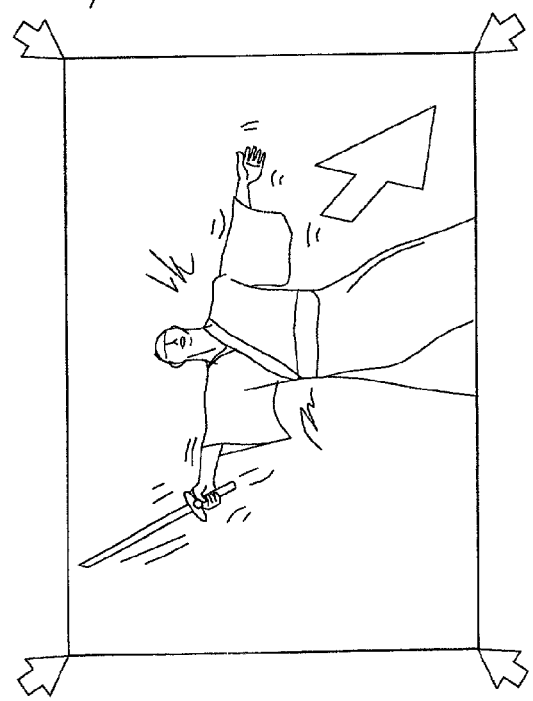
Figure 14C:
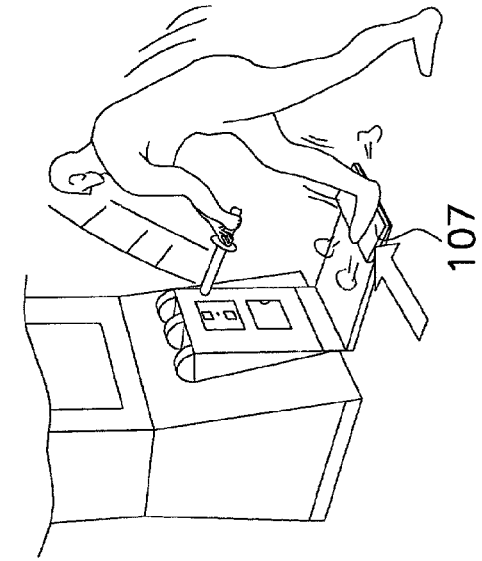

The maneuver determining means 16 also determines whether or not the foot pedal 107 has been pressed. If it has been pressed, the position of the origin P0 in the player coordinate system is advanced in the game space G by the number of times pressed. The distance that the player moves forward in the game space G each time the foot pedal 107 is pressed is set beforehand to be, for example, 1 m. In response to the player's advance, the maneuver determining means 16 also shifts the game space coordinates for the sword object. FIGS. 14A and 14B are screen shots showing the changes in the display when the foot pedal 107 has been pressed. FIG. 14A is a screen shot illustrating a situation in which the sword object will not strike the opponent because the player is too far away from him. FIG. 14B is a screen shot illustrating what occurs when the player presses on the foot pedal 17 (as shown in FIG. 14C) and swings the sword object. As illustrated in the figure, the player moves closer to the opponent in the game space G (i.e., the image is zoomed up), thereby allowing the player's sword object to strike the opponent. By depressing the foot pedal 107, and at the same time using his or her entire body to attack the opponent, the player can feel a sense of presence in the game.

In addition to these processes, the maneuver determining means 16 also determines whether or not the player has used a predetermined weapon—e.g., a knife which can be thrown.

For instance, with the sword 200 pointed at an opponent on the screen, a knife can be thrown at the targeted opponent if the switches 205a and 205b are pressed to order that the knife be thrown. When the line extending through the two points $Q_1$, $Q_2$ on the sword 200 intersects an opponent on the screen, a marker indicating that the player has targeted that opponent is preferably displayed.

In accordance with the hit determination results and the maneuver determination results, the status determining means 17 calculates the amount of damage on the opponent and the remaining life in the player. For example, when the hit determination results are that only an opponent's clothing has been ripped, the opponent damage level will be "0." When the opponent has only been grazed or knocked down, the opponent damage level will be increased a fixed amount. The degree of damage to the opponent, and degree to which the opponent damage level has been increased, are both stored in the RAM 19 (not shown in the figures).

When the results of the maneuver determination are that a prescribed command has been input or that a weapon has been used, the status determination means 17 increases the opponent damage level to the degree corresponding to the prescribed command or weapon used. The prescribed commands and the weapons, as well as the degree of increase in the opponent damage level, are stored in the RAM 19 (not shown in the figures).

Figure 15:
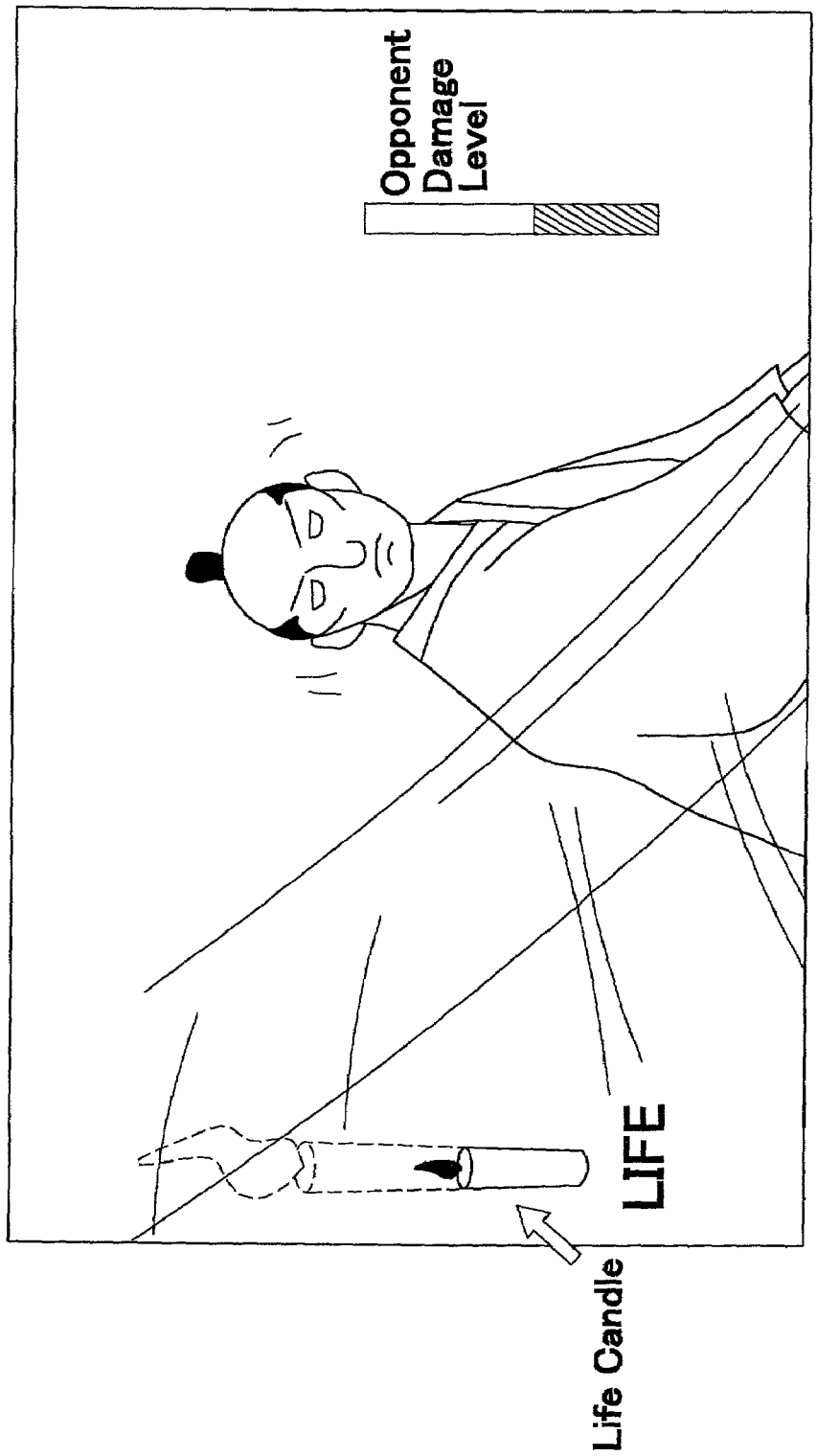
FIG. 15 shows the change in the display in the combat video game device illustrated in FIG. 2 when a player's remaining life has been reduced due to an opponent's attack.

Meanwhile, the status determining means 17 updates the amount of life remaining in the player in accordance with the position of the opponent, the position of the player, and the movement of the player, in the game space G. In situation in which the player was not able to prevent an enemy attack, the amount of life that the player has remaining will be decreased by a predetermined amount per round of enemy attack. FIG. 15 is a screen shot in which the status determining means 17 lowers the amount of life remaining in a player who has undergone an enemy attack.

Furthermore, the status determining means 17 will vibrate the sword 200 in response to a hit by activating the motor 204 disposed in the handle 201 of the sword 200. The video game is made more realistic because will not only see that he has struck something, but also physically feel it due to the vibration. Moreover, the game will feel more realistic because the strength of the vibration provided can be varied according to the strength of the hit.

C-3. Process Flow

FIGS. 16 through 19 are flowcharts illustrating the flow of the overall processes/procedures in the present combat video game system 2000. Below, details on the flow of the processes in the present game system will be explained with reference to these figures.

C-3-1. Main Routine

Figure 16:
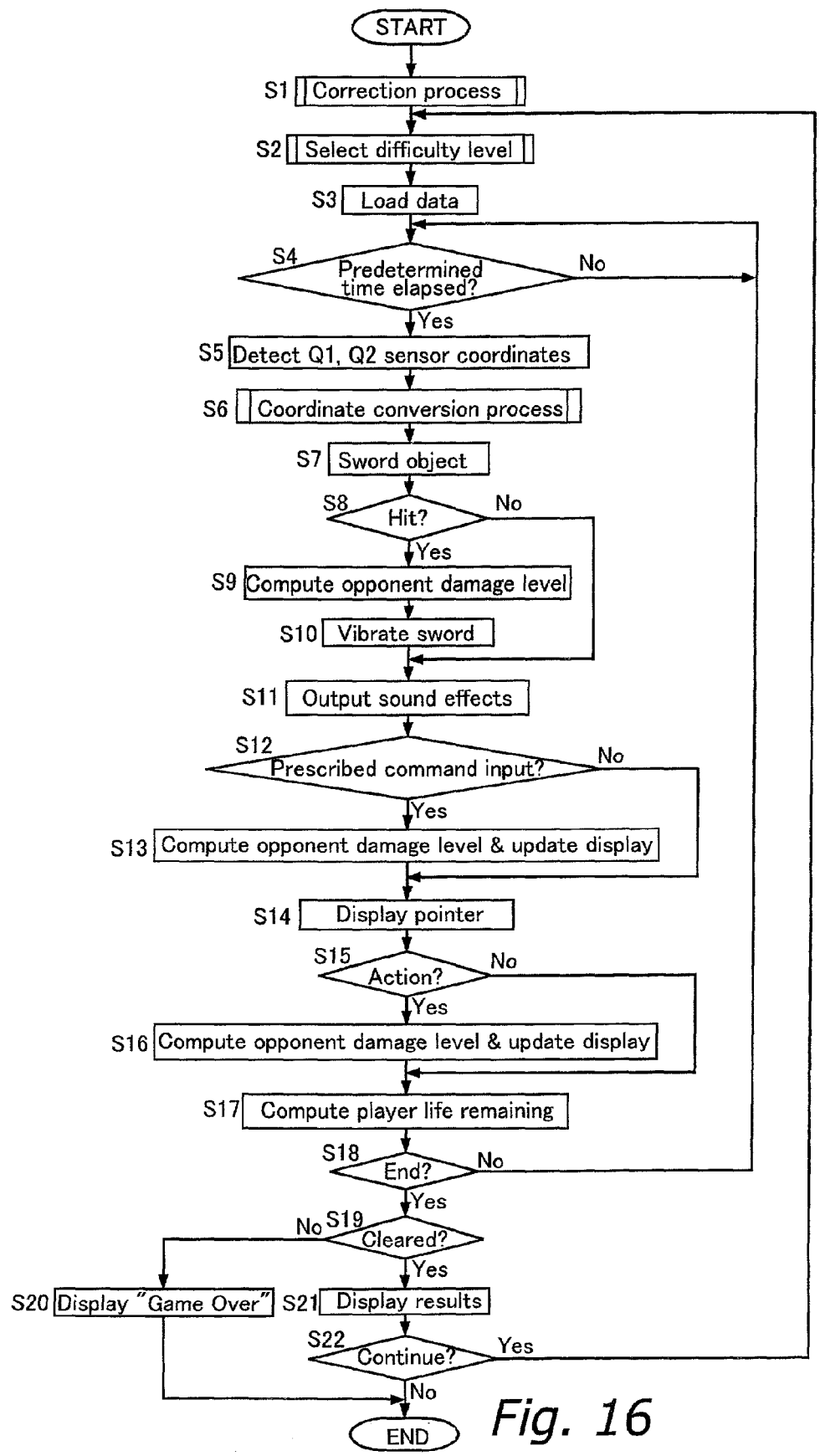
FIG. 16 shows a flowchart that illustrates the overall process of the combat video game device illustrated in FIG. 2.

FIG. 16 is a flowchart illustrating the flow of the main routine of the present video game system. This routine is begun by a player inserting a coin into the coin deposit slot 108 in the game device 100.

Step S1: The correction means 11 carries out the correction process noted above, and calculates a correction coefficient in order to correct for the player's height. This process will be described below when discussing FIG. 17.

Step S2: The difficulty level selection means 12 accepts the selection of a difficulty level by a player, such as beginner, intermediate, or advanced. This process will be described below when discussing FIG. 18. It should be noted that the difficulty level selection process may be performed prior to the correction process noted above.

Step S3: Data is loaded after the correction process and the difficulty level selection process. In other words, the game program and data required during the course of the game are read into the RAM 19 from the semiconductor memory 4. When the data is loaded, a game screen such as the one shown in FIG. 11 is displayed and the game begins.

Step S4: After the game has begun, the processes in steps S5 through S18 are carried out at predetermined time intervals. In the present example, that time interval is set at 16 msec.

Step S5: The three dimensional input conversion means 13 acquires the sensor coordinates of the sword 200 in the real space R from the position detector 6 every 16 msec.

Step S6: Next, the three dimensional input conversion means 13 converts the acquired sensor coordinates into player coordinates, and then into game space coordinates. This process will be described in greater detail below. The game space coordinates are then written into the trajectory table in the RAM 19 by the hit determining means 14.

Step S7: The game space coordinates are then transformed into a perspective projection by the three dimensional input conversion means 13 in order to calculate the display position of the sword object on the monitor 101. The sword object is accordingly displayed on the monitor 101. In other words, the sword object will be displayed every 16 msec during the course of the game.

Steps S8, S9, S10: The hit determining means 14 determines the trajectory of the sword during the past 256 msec from the trajectory table, and at Step S8 determines whether or not the sword object has struck an enemy or an object other than an enemy. If there has been a hit on the enemy, the level of damage to the enemy is calculated at Step S9 by the status determining means 17. If, however, the object struck is something other than the enemy, the opponent damage level will not change. In addition, the sword 200 will be vibrated at Step S10 in accordance with the object and the force with which it was struck, i.e., the status determining means 17 will vary the drive pulse intervals for the motor 204 built into the sword 200. For example, the reality of the game may be heightened by imparting a strong vibration to the sword 200 when the enemy has been knocked down and only a weak vibration when the enemy is grazed.

Step S11: The audio output control means 15 outputs sound effects in accordance with the hit determination results.

Steps S12, S13: At Step S12, the maneuver determining means 16 determines whether or not a prescribed command has been input. In other words, the maneuver determining means 16 determines the trajectory of the sword object within the game space G based on the data in the trajectory table, and determines whether or not the trajectory corresponds to a predetermined pattern. Discrepancies in the predetermined pattern are tolerated to a certain extent in making this determination. If the trajectory corresponds a prescribed command, then at Step S13 the status determining means 17 raises the opponent damage level to the degree that is associated with the prescribed command, and updates the display. If a prescribed command has not been input, then nothing is done.

Steps S14, S15, S16: At Step S14, the maneuver determining means 16 determines whether or not the player is pointing the sword 200 at an enemy on the monitor 101, and if so, displays a marker thereon. The marker may, for example, be a circle encompassing the targeted enemy. At Step S15, it is determined whether or not a weapon has been discharged toward the targeted enemy (e.g., a knife is thrown at the enemy). At Step S16, if a weapon has been discharged toward the targeted enemy, the status determining means 17 will increases the level of opponent damage by an amount associated with that type of weapon, and then update the display.

Step S17: Depending on whether or not the player's sword object has warded off an attack from the enemy, the status determining means 17 calculates the amount of player life remaining and updates the display. For example, if it is determined that an enemy's sword object and the player's sword object have struck, the hit determining means may determine that the enemy's attack was fended off. Conversely, if an enemy has attacked the player and the player's sword object has not struck the enemy's sword object, it may be determined that the player has been injured.

Step S18: In this step, it is determined whether or not the player has any life remaining. If the player does not have any life remaining, then the process moves to Step S19. If the player does have life remaining, the routine returns to Step S4, and the S4–S18 process is repeated every 16 msec.

Steps S19, S20, S21, S22: At Step S20, it is determined whether or not the selected stage has been cleared, and if it has not been cleared, "Game Over" is displayed and the game is terminated. If it has been cleared, the player's results are displayed at Step S21, and then at Step S22 a screen asking the player whether or not he or she wants to continue will be displayed. If "Continue" is selected, the routine returns once more to Step S2, and that process is again carried out. If "End" is selected, the game terminates.

C-3-2. Correction Routine

Figure 17:
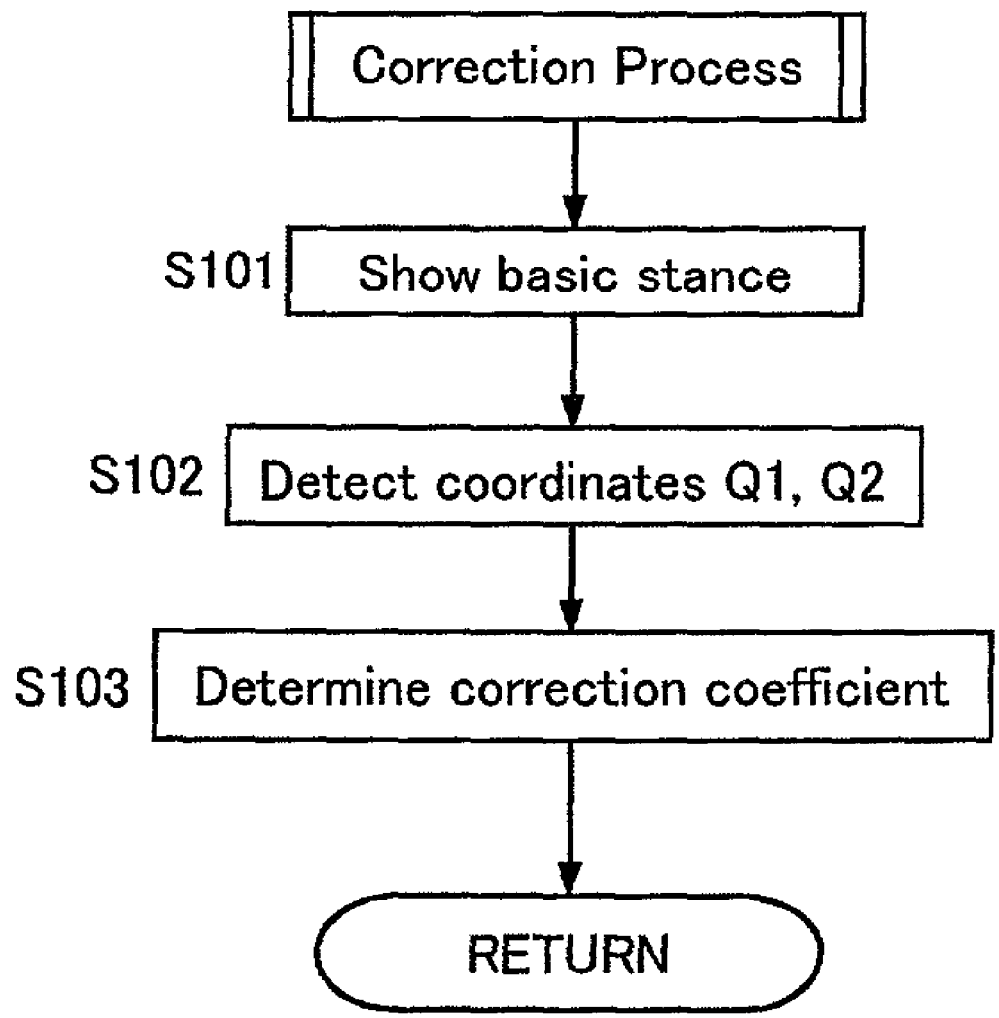
FIG. 17 shows a flowchart that illustrates a correction process in the combat video game device illustrated in FIG. 2.

FIG. 17 shows the correction process carried out in Step S1 of the main routine. At Step S101, the correction means 11 displays the screen shown in FIG. 9, which prompts the player to assume the basic stance. At Step S102, the correction means 11 stands by for a fixed period of time, and then detects the sensor coordinates of the two points $Q_1$, $Q_2$ on the sword 200. The player's height is then estimated from the sensor coordinates read, and the correction coefficient is determined.

C-3—3. Difficulty Level Selection Routine

Figure 18:
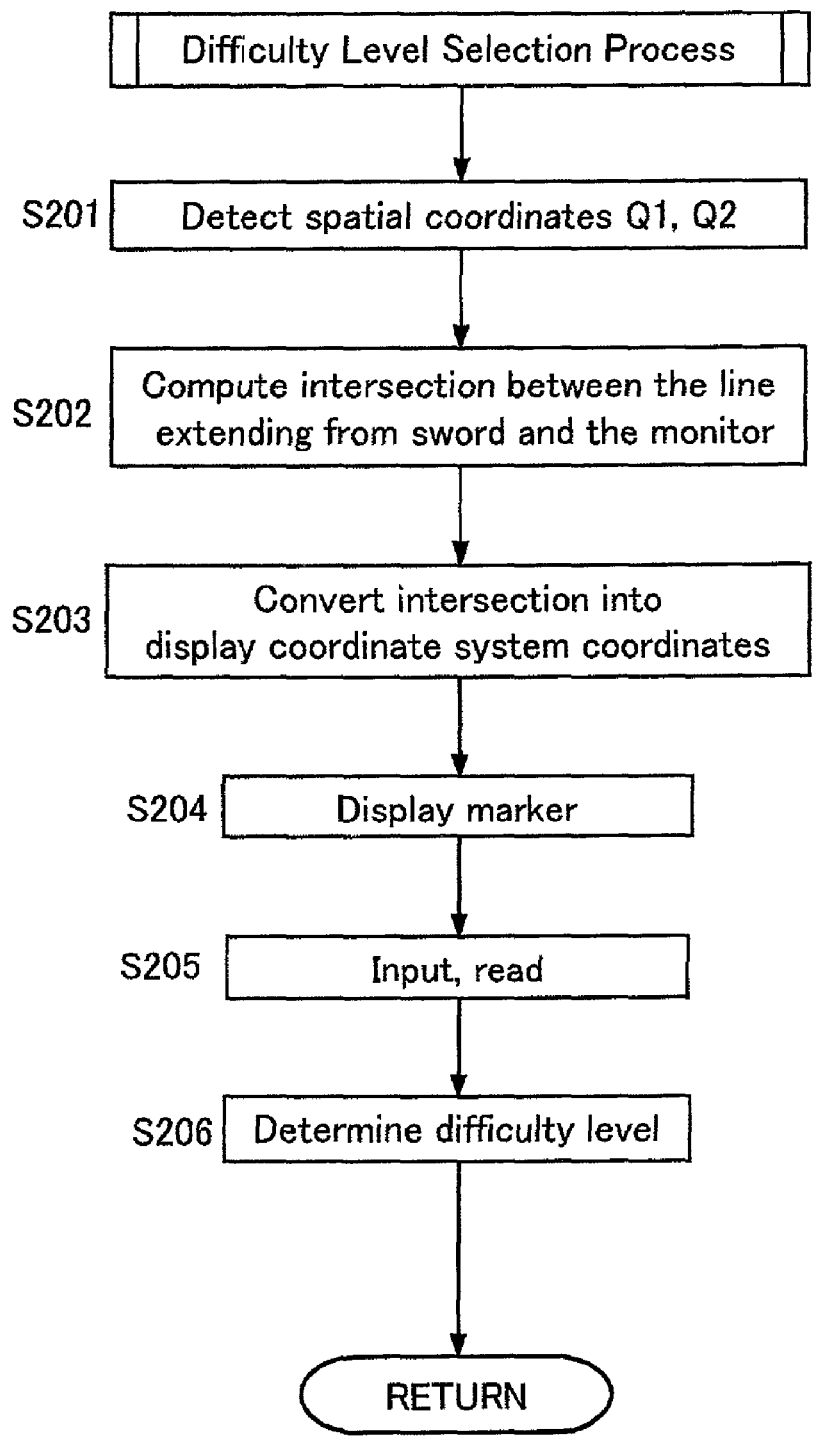
FIG. 18 shows a flowchart that illustrates the difficulty level selection process in the combat video game device illustrated in FIG. 2.

FIG. 18 shows the difficulty level selection process conducted in Step S2. This flowchart explains what occurs when the sword 200 is used to make a menu selection.

Steps S201, S202, S203: At Step S201, the difficulty level selection means 12 reads in the sensor coordinates for the two points $Q_1$, $Q_2$ on the sword 200. At Step S202, the difficulty level selection means 12 calculates the point in real space where the imaginary line extending from the tip of the sword 200 intersects the monitor 101. At Step 203, the difficulty level selection means 12 then calculates the screen coordinates in which the imaginary line intersects with the monitor 101.

Steps S204, S205, S206: At Step S204, the difficulty level selection means 12 will display a marker on the point on the monitor 101 that was determined in Step S203. At Step S205, when either of the switches 205a or 205b on the sword 200 is pressed with the marker placed on a menu option on the monitor 101, the difficulty level selection means 12 will select the level of difficulty indicated.

As described earlier, the selection of the level of difficulty and weapon to be used may be accomplished through a switch on the game device main unit, or through a switch on the sword 200.

C-3-4. Coordinate Conversion Routine

Figure 19:
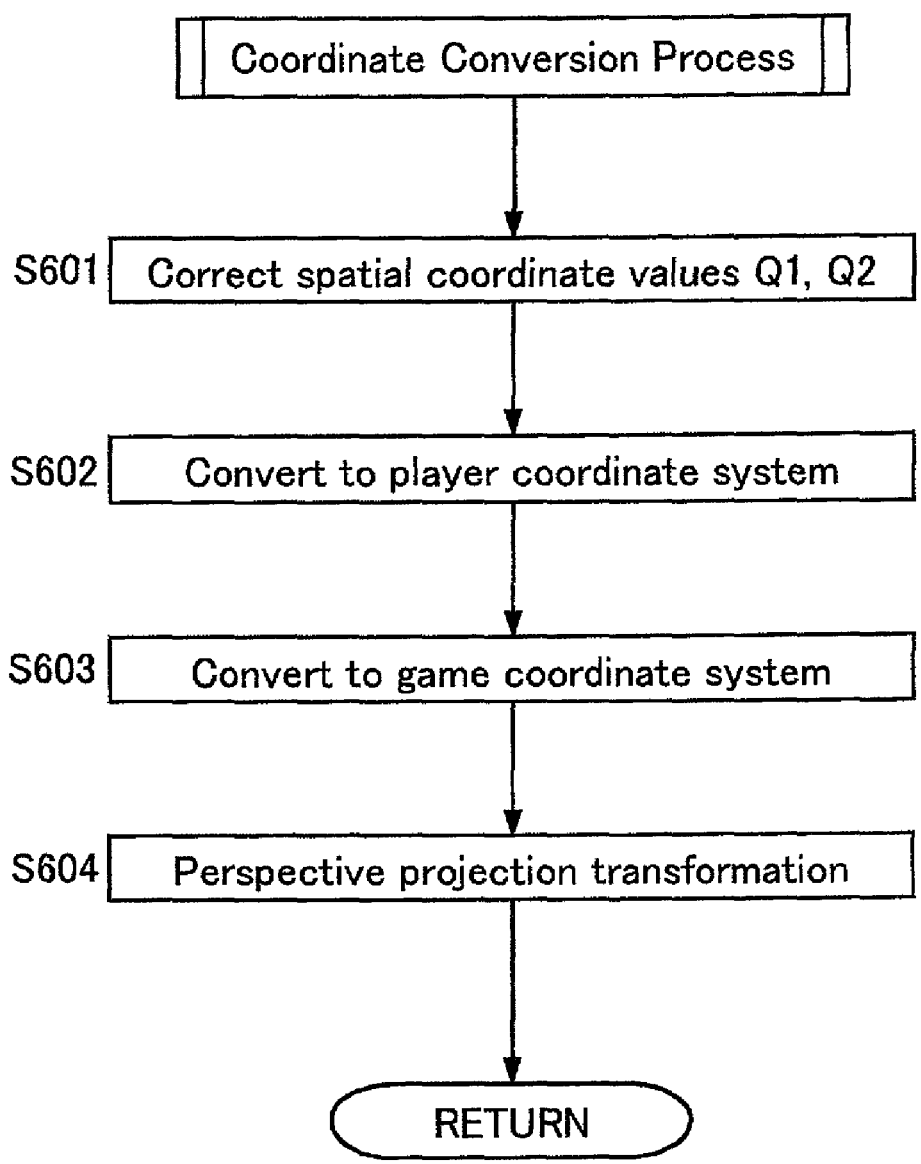
FIG. 19 shows a flowchart that illustrates a coordinate conversion process in the combat video game device illustrated in FIG. 2.

FIG. 19 shows the coordinate conversion process conducted in Step S6 of the main routine.

At Step S601, the three dimensional input conversion means 13 uses the correction coefficient determined in Step S1 and corrects the two sensor coordinates of the sword 200 in the real space R. Accordingly, the actions of all players are made equivalent to the actions of a standard player, regardless of differences in height.

At Step S602, the three dimensional input conversion means 13 converts the values of the corrected sensor coordinates into player coordinates in the player coordinate system, and then at Step S603 converts the player coordinates into game space coordinates in the game space coordinate system. At Step S604, it performs a perspective projection transformation on the game space coordinates of the sword 200 in order to calculate the position in which the sword object will be displayed on the monitor 101.

3. Other Embodiments

A. Another Example of Converting A Position In The Real Space Into A Position In The Game Space Depending on the type of video game and on the type of virtual interface device employed, a position in the real space R and a position in the game space G may be specified with something other than three dimensional coordinates. For example, the real space R and the game space G can be respectively partitioned into a number of real cells r1, r2, . . . and virtual cells g1, g2, . . . of predetermined size, and a cell storage member can be provided that stores both the cell numbers identifying each cell, and the position of each cell.

In this modification, the three dimensional input conversion means 13 will convert the three dimensional coordinates position detector 6 into real cell numbers, convert the real cell numbers into virtual cell numbers, and then determine the display position of the sword object based on the virtual cell numbers.

B. Another Example of How The Origin In The Player Coordinate System Is Chosen

It is also possible to make the both origin in the player coordinate system and the size of the increments on the coordinate axes different, depending upon the height of the player. This allows the game to be adjusted for the height of the player. For example, the correction means 11 will store a player coordinate system in which one particular height is considered to be the standard.

If a player is determined to be taller than this standard height by the correction means at Step S1, the position of the origin in the player coordinate system will be lowered beneath the standard position, and the size of the increments on the coordinate axes will be made larger. If the player is determined to be shorter than the standard height, the opposite process will be carried out.

C. Another Example of Hit Determination

Figure 20A:
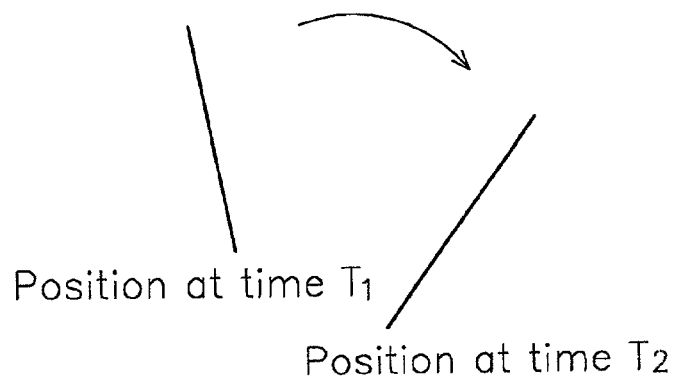
FIGS. 20A, 20B, and 20C show an example of another method of determining whether or not an object in the virtual space has been struck.
Figure 20B:
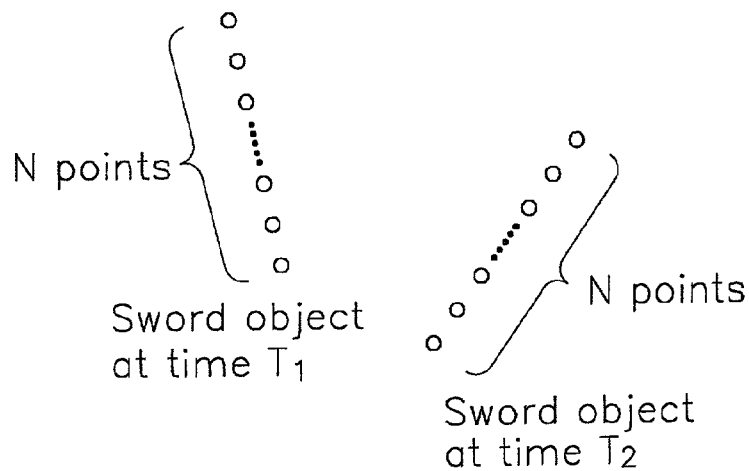
Figure 20C:
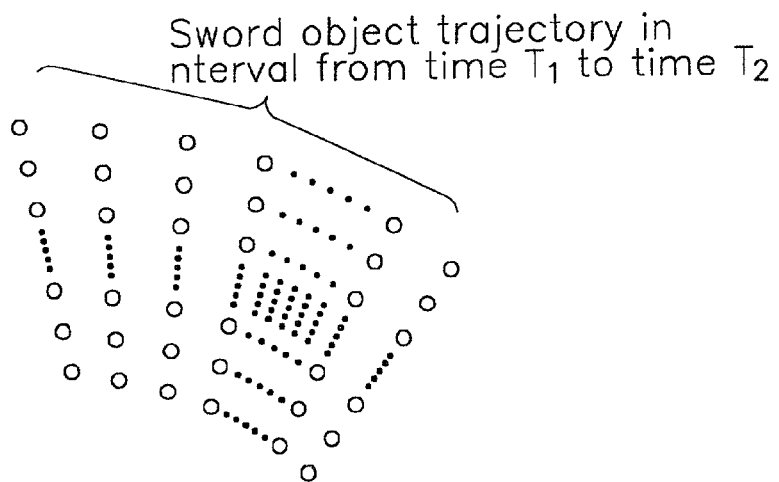

FIGS. 20A, 20B, and 20C illustrate a method of speeding up the ability of the hit determining means 14 to determine whether or not the sword object has struck a target object. The solid lines shown in FIG. 20A indicate the position of the blade of the sword object in the game space G at a time $T_1$ and a time $T_2$, with time $T_2$ being 16 msec after $T_1$. FIG. 20B shows the blade of the sword object represented by N number of points at time $T_1$ and time $T_2$. FIG. 20C shows the trajectory of the sword object between times $T_1$ and $T_2$ as represented by the N number points on the blade thereof.

In order to determine whether or not the sword object has struck something between times $T_1$ and $T_2$, the hit determining means 14 will calculate the distances between each point on the sword object and the target object. If the distance between one or more of the points is determined to be at or below a predetermined value, then it is determined that the target object has been struck by the sword object. This method speeds up the ability of the hit determining means 14 to determine whether or not the sword object has struck a target object, because it does not require one or more points on the sword object to actually overlap a target object in order for a hit determination to be made. Instead, the target object need only be within a predetermined distance of one or more of a reduced number of points on the sword object. This allows the computational load placed on the CPU 10 to be reduced, and thus allows the hit determination to be made more quickly.

Figure 21:
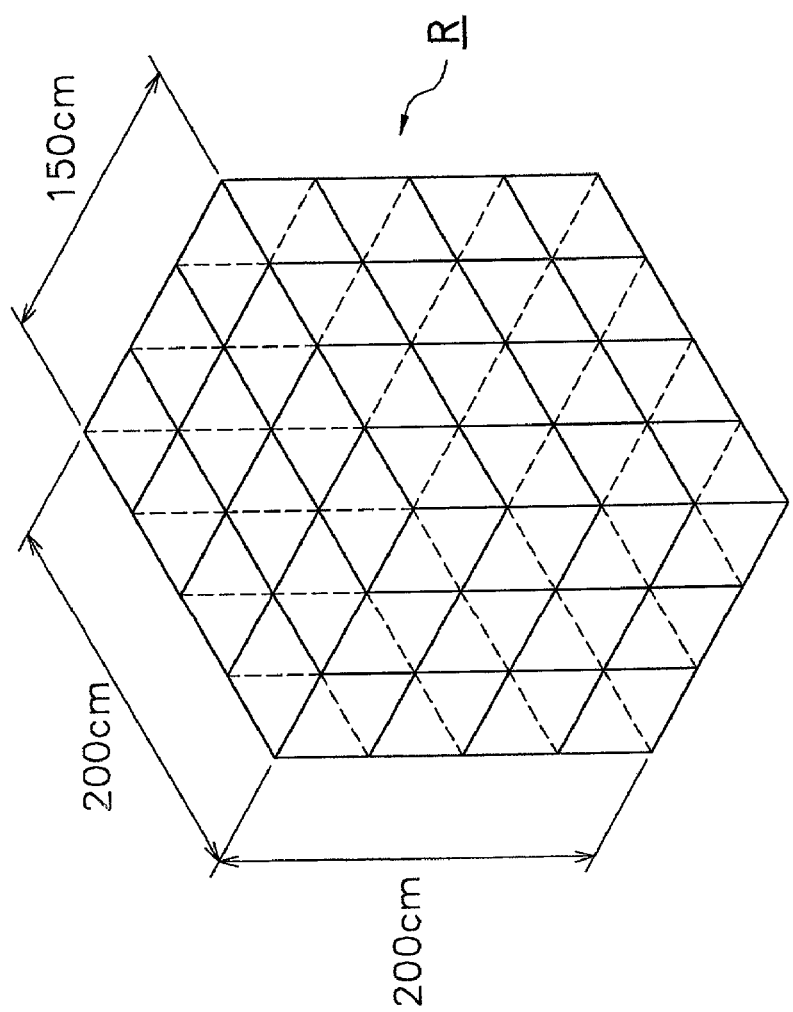
FIG. 21 shows an example of another method of determining the input of a preset command.

D. Another Example Of Determining Whether Or Not A Prescribed Command Has Been Entered The maneuver determining means 16 may determine whether or not a prescribed command has been input in a manner different from that described above. FIG. 21 is a diagram of a real space R partitioned into a suitable number of sub-spaces (hereinafter referred to as "cells"). In the same way as described above, the real space R is partitioned into a number of real cells r1, r2, . . . and cell numbers for identifying the cells are ascribed to each real cell. The maneuver determining means 16 stores the cell numbers in the sequence in which the two points $Q_1$ and $Q_2$ on the sword 200 have passed through the cells within a predetermined time period $\Delta t_3$. From the stored cell numbers, the maneuver determining means 16 then compares the pattern of passage through the real cells with a prescribed pattern to determine whether or not a prescribed command has been input.

E. Modifications To The Real Interface device

Vibration may be provided in two or more places on the real interface device. For example, a vibration means can be place at both ends of the sword 200, which allows the strength of the vibration applied to the sword 200 to be varied according to the object struck by the sword object in the game space. For example, both vibrating means could be activated when the player's sword object strikes an enemy's sword object, while only one vibrating means could be activated when the player's sword object strikes a softer object.

Moreover, output means other than the vibration means may be installed on the real interface device. For example, an audio output means, a light output means, or the like could be installed on the real interface device in accordance with the nature of the video game.

F. Programs and Recording Media

Software programs that execute the aforementioned game method on a computer are included in the scope of the present invention, as too are computer-readable recording media on which the programs are recorded. Computer-readable recording media include, but are not limited to, floppy disks, hard disks, semiconductor memory, CD-ROMs, DVDs, magneto-optical disks (MOs) and other computer-read/writeable recording media that would allow the aforementioned software programs to be stored thereon.

This application claims priority to Japanese Patent Application No. 2001-096856. The entire disclosure of Japanese Patent Application No. 2001-096856 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A video game device in which a real interface device that a player within a real space manipulates is represented by a virtual interface device within a virtual space, the video game device comprising:
   position detecting means that detects the three dimensional coordinates of at least two points on the real interface device within the real space;
   conversion means that converts the three dimensional coordinates of the real interface device within the real space into three dimensional coordinates within the virtual space, and displays the virtual interface device in the three dimensional coordinates within the virtual space on a display;
   operating means that displays movements of the virtual interface device on the display, the operating means causing the position detecting means to detect the three dimensional coordinates of the real interface device within the real space and the conversion means to determine the three dimensional coordinates of the virtual interface device within the virtual space at predetermined time intervals;
   intersection display control means that calculates a point in which an imaginary straight line that extends between the points on the real interface device intersects with the display and displays a marker thereon; and
   selection accepting means that determines whether or not the point lies on an object being displayed on the display, and allows the player to select the object if the point lies thereon.

2. The video game device set forth in claim 1, further comprising:
   trajectory storing means that stores the three dimensional coordinates of the virtual interface device taken at predetermined time intervals; and
   hit determining means that calculates a trajectory and speed of the virtual interface device based upon the three dimensional coordinates stored in the trajectory storing means, determines whether or not the virtual interface device has struck an object within the virtual space based on the trajectory and speed thereof, and specifies the object struck if a strike has occurred.

3. The video game device set forth in claim 1, comprising:
   correction means that detects any difference between the player's height and a predetermined standard height based upon the three dimensional coordinates of the real interface device, and corrects the three dimensional coordinates of the virtual interface device if any difference exists.

4. The video game device set forth in claim 1, wherein the position detecting means further comprises:
   light emitting means provided on the real interface device;
   at least a pair of light detecting means that detect light from the light emitting means; and
   measuring means that measures the position of the light emitting means based on the light detected therefrom, and outputs the position of the light emitting means to the conversion means.

5. A video game device in which a real interface device that a player within a real space manipulates is represented by a virtual interface device within a virtual space, the video game device comprising:
   position detecting means that detects three dimensional coordinates of the real interface device within the real space;
   conversion means that converts the three dimensional coordinates of the real interface device within the real space into three dimensional coordinates within the virtual space, and displays the virtual interface device in the three dimensional coordinates within the virtual space on a display; and
   operating means that displays movements of the virtual interface device on the display, the operating means causing the position detecting means to detect the three dimensional coordinates of the real interface device within the real space and the conversion means to determine the three dimensional coordinates of the virtual interface device within the virtual space at predetermined time intervals;
   trajectory storing means that stores the three dimensional coordinates of the virtual interface device taken at predetermined time intervals;
   command storage means that stores a plurality of commands that are associated on a one-to-one basis with a plurality of predetermined trajectory patterns of the virtual interface device; and
   command execution means that calculates a trajectory of the virtual interface device based upon the three dimensional coordinates of the virtual interface device stored in the trajectory storing means, determines whether or not the trajectory matches any of the predetermined trajectory patterns, and executes the command associated with the predetermined trajectory pattern if a match exists.

6. The video game device set forth in claim 5, further comprising:
   hit determining means that calculates a trajectory and speed of the virtual interface device based upon the three dimensional coordinates stored in the trajectory storing means, determines whether or not the virtual interface device has struck an object within the virtual space based on the trajectory and speed thereof, and specifies the object struck if a strike has occurred.

7. The video game device set forth in claim 5, comprising:
   correction means that detects any difference between the player's height and a predetermined standard height based upon the three dimensional coordinates of the real interface device, and corrects the three dimensional coordinates of the virtual interface device if any difference exists.

8. The video game device set forth in claim 5, wherein the position detecting means further comprises:
   light emitting means provided on the real interface device;
   at least a pair of light detecting means that detect light from the light emitting means; and
   measuring means that measures the position of the light emitting means based on the light detected therefrom, and outputs the position of the light emitting means to the conversion means.

9. A video game device in which a real interface device that a player within a real space manipulates is represented by a virtual interface device within a virtual space, the video game device comprising:
   position detecting means that detects three dimensional coordinates of the real interface device within the real space;
   conversion means tat converts the three dimensional coordinates of the real interface device within the real space into three dimensional coordinates within the virtual space, and displays the virtual interface device in the three dimensional coordinates within the virtual space on a display; and operating means that displays movements of the virtual interface device on the display, the operating means causing the position detecting means to detect the three dimensional coordinates of the real interface device within the real space and the conversion means to determine the three dimensional coordinates of the virtual interface device within the virtual space at predetermined time intervals;

trajectory storing means that stores the three dimensional coordinates of the real interface device taken at predetermined time intervals;

command storage means that stores a plurality of commands that are associated on a one-to-one basis with a plurality of predetermined trajectory patterns of the real interface device; and command execution means that calculates a trajectory of the real interface device based upon the three dimensional coordinates stored in the trajectory storing means, determines whether or not the trajectory matches any of the predetermined trajectory patterns, and executes the command associated with the predetermined trajectory pattern if a match exists.

10. The video game device set forth in claim 9, further comprising:

trajectory storing means that stores the three dimensional coordinates of the virtual interface device taken at predetermined time intervals; and hit determining means that calculates a trajectory and speed of the virtual interface device based upon the three dimensional coordinates of the virtual interface device stored in the trajectory storing means, determines whether or not the virtual interface device has struck an object within the virtual space based on the trajectory and speed thereof, and specifies the object struck if a strike has occurred.

11. The video game device set forth in claim 9, comprising:

correction means that detects any difference between the player's height and a predetermined standard height based upon the three dimensional coordinates of the real interface device, and corrects the three dimensional coordinates of the virtual interface device if any difference exists.

12. The video game device set forth in claim 9, wherein the position detecting means further comprises:

light emitting means provided on the real interface device;

at least a pair of light detecting means that detect light from the light emitting means; and measuring means that measures the position of the light emitting means based on the light detected therefrom, and outputs the position of the light emitting means to the conversion means.

13. A video game device in which a real interface device that a player within a real space manipulates is represented by a virtual interface device within a virtual space, the video game device comprising:

position detecting means that detects three dimensional coordinates of the real interface device within the real space;

conversion means that converts the three dimensional coordinates of the real interface device within the real space into player coordinates in a player coordinate system which expresses relative positions of the player in the real space and relative positions of a virtual player in the virtual space, converts the player coordinates into three dimensional coordinates within the virtual space, and displays the virtual interface device in the three dimensional coordinates within the virtual space on a display; and operating means that displays movements of the virtual interface device on the display, the operating means causing the position detecting means to detect the three dimensional coordinates of the real interface device within the real space and the conversion means to determine the three dimensional coordinates of the virtual interface device within the virtual space at predetermined time intervals.

14. The video game device set forth in claim 13, further comprising:

trajectory storing means that stores the three dimensional coordinates of the virtual interface device taken at predetermined time intervals; and hit determining means that calculates a trajectory and speed of the virtual interface device based upon the three dimensional coordinates stored in the trajectory storing means, determines whether or not the virtual interfere device has struck an object within the virtual space based on the trajectory and speed thereof, and specifies the object struck if a strike has occurred.

15. The video game device set forth in claim 13, comprising:

correction means that detects any difference between the player's height and a predetermined standard height based upon the three dimensional coordinates of the real interface device, and corrects the three dimensional coordinates of the virtual interface device if any differences exists.

16. The video game device set forth in claim 13, wherein the position detecting means further comprises:

light emitting means provided on the real interface device;

at least a pair of light detecting means that detect light from the light emitting means; and measuring means that measures the position of the light emitting means based on the light detected therefrom, and outputs the position of the light emitting means to the conversion means.

17. A video game method employed in a video game device in which a real interface device that a player within a real space manipulates is represented by a virtual interface device within a virtual space, the video game method comprising the steps of:

detecting at least two of the three dimensional coordinates of the real interface device within the real space;

converting the three dimensional coordinates of the real interface device within the real space into three dimensional coordinates within the virtual space;

displaying the virtual interface device in the three dimensional coordinates within the virtual space on a display;

displaying movements of the virtual interface device on the display;

detecting the three dimensional coordinates of the real interface device within the real space;

determining the three dimensional coordinates of the virtual interface device within the virtual space at predetermined time intervals;

calculating a point in which an imaginary straight line that extends between the points on the real interface device intersects with the display and displaying a marker thereon; and determining whether or not the point lies on an object being displayed on the display, and allowing the player to select the object if the point lies thereon.

18. A video game program stored on one or more computer readable media that is employed in a video game device in which a real interface device that a player within a real space manipulates is represented by a virtual interface device within a virtual space, the video game program causing the video game device to execute the steps of:
- detecting at least two of the three dimensional coordinates of the real interface device within the real space;
- converting the three dimensional coordinates of the real interface device within the real space into three dimensional coordinates within the virtual space;
- displaying the virtual interface device in the three dimensional coordinates within the virtual space on a display;
- displaying movements of the virtual interface device on the display;
- detecting the three dimensional coordinates of the real interface device within the real space;
- determining the three dimensional coordinates of the virtual interface device within the virtual space at predetermined time intervals;
- calculating a point in which an imaginary straight line tat extends between the points on the real interface device intersects with the display and displaying a marker thereon; and
- determining whether or not the point lies on an object being displayed on the display, and allowing the player to select the object if the point lies thereon.

19. One or more computer-readable media having stored thereon a computer program that, when executed by one or more processors employed in a computer of a video game device in which a real interface device that a player within a real space manipulates is represented by a virtual interface device within a virtual space, causes the one or more processors to:
- detect at least two of the three dimensional coordinates of the real interface device within the real space;
- convert the three dimensional coordinates of the real interface device within the real space into three dimensional coordinates within the virtual space;
- display the virtual interface device in the three dimensional coordinates within the virtual space on a display;
- display movements of the virtual interface device on the display;
- detect the three dimensional coordinates of the real interface device within the real space;
- determine the three dimensional coordinates of the virtual interface device within the virtual space at predetermined time intervals;
- calculate a point in which an imaginary straight line that extends between the points on the real interface device intersects with the display and display a marker thereon; and
- determine whether or not the point lies on an object being displayed on the display, and allow the player to select the object if the point lies thereon.

* * * * *

UNITED STATES PATENT AND TRADEMARK OFFICE
CERTIFICATE OF CORRECTION

PATENT NO. : 7,001,272 B2  Page 1 of 1
APPLICATION NO. : 10/106259
DATED : February 21, 2006
INVENTOR(S) : Akihisa Yamashita et al.

It is certified that error appears in the above-identified patent and that said Letters Patent is hereby corrected as shown below:

In column 22, line 62, please change "tat" to --that--.

In column 25, line 21, please change "tat" to --that--.

Signed and Sealed this

First Day of August, 2006

JON W. DUDAS
*Director of the United States Patent and Trademark Office*